United States Patent [19]
Brundage

[11] Patent Number: 4,464,977
[45] Date of Patent: Aug. 14, 1984

[54] FLUID PRESSURE DEVICE
[76] Inventor: Robert W. Brundage, 135 Paradise Rd., Painesville, Ohio 44077
[21] Appl. No.: 394,160
[22] Filed: Jul. 1, 1982

Related U.S. Application Data

[63] Continuation-in-part of Ser. No. 205,214, Nov. 12, 1980, abandoned, which is a continuation-in-part of Ser. No. 189,913, Oct. 2, 1980, abandoned, which is a continuation-in-part of Ser. No. 51,843, Jun. 25, 1979, abandoned, and Ser. No. 51,844, Jun. 25, 1979, abandoned.

[51] Int. Cl.$^3$ .............................................. F15B 9/10
[52] U.S. Cl. ............................... 91/376 R; 91/417 R; 137/528; 137/529; 137/540
[58] Field of Search ............... 91/49, 376 R, 378, 385, 91/386, 387, 417 R; 137/85, 115, 494, 528, 529, 540, 625.64

[56]     References Cited
U.S. PATENT DOCUMENTS

| | | |
|---|---|---|
| 1,548,232 | 8/1925 | Westbrook ........................ 91/376 X |
| 1,623,431 | 4/1927 | McVoy . |
| 2,615,466 | 10/1952 | Garde ........................... 91/417 R X |
| 2,649,688 | 8/1953 | Slomer . |
| 2,650,609 | 9/1953 | Herbst ........................... 91/417 R X |
| 2,668,556 | 2/1954 | Meyer . |
| 2,788,800 | 4/1957 | Towler . |
| 2,813,519 | 11/1957 | Persson ............................... 91/378 X |
| 2,930,360 | 3/1960 | Yando ................................... 91/385 |
| 2,944,564 | 7/1960 | Pettey . |
| 2,959,156 | 11/1960 | Dreptin . |
| 2,977,984 | 4/1961 | Slomer ............................ 137/115 X |
| 3,017,897 | 1/1962 | Seguenot ............................. 137/529 |
| 3,131,608 | 9/1964 | Yando . |
| 3,279,743 | 10/1966 | De La Garza . |
| 3,495,546 | 2/1970 | Brown ............................... 251/30 X |
| 3,613,717 | 10/1971 | Smith ......................... 137/625.64 X |
| 3,709,257 | 1/1973 | Faisandier ....................... 137/625.64 |
| 3,800,663 | 4/1974 | Clark ............................... 91/376 X |
| 3,842,857 | 10/1974 | McCormack . |
| 3,902,402 | 9/1975 | Walters ........................ 91/417 R X |
| 3,943,824 | 3/1976 | Fletcher . |
| 4,074,699 | 2/1978 | Stampfli ......................... 137/625.64 |
| 4,106,522 | 8/1978 | Manesse ........................ 137/540 X |
| 4,150,695 | 4/1979 | Kosugul ......................... 137/625.64 |
| 4,212,323 | 7/1980 | Qureshi ........................... 91/378 X |

FOREIGN PATENT DOCUMENTS

| | | |
|---|---|---|
| 911686 | 5/1954 | Fed. Rep. of Germany . |
| 1188398 | 9/1961 | Fed. Rep. of Germany . |
| 1600734 | 1/1970 | Fed. Rep. of Germany . |
| 2213439 | 3/1972 | Fed. Rep. of Germany . |
| 2047525 | 3/1972 | Fed. Rep. of Germany . |
| 2219929 | 4/1972 | Fed. Rep. of Germany . |
| 2232566 | 7/1972 | Fed. Rep. of Germany . |
| 2461021 | 6/1976 | Fed. Rep. of Germany . |
| 1048601 | 12/1953 | France . |
| 616361 | 2/1961 | Italy . |
| 860665 | 2/1961 | United Kingdom .................. 91/378 |

OTHER PUBLICATIONS

American Barmag, Charlotte, N. Carolina—Electrically Control Directional Flow Valve.
Fluid Controls, Inc., Mentor, OH—Solenoid Cartridge Valve, 1977 Catalog, pp. 20.01 to 21.02.
3 pages—Fluid Pressure Mechanisms by H. G. Conway, (2nd Div.), pp. 191, 195 & 196.

Primary Examiner—Robert G. Nilson
Attorney, Agent, or Firm—Body, Vickers & Daniels

[57]     ABSTRACT

A fluid pressure device wherein a relatively low powered analog electrical signal accurately controls the position of the output member of a fluid pressure powered actuator which in turn can be used to exert mechanical forces or operate mechanical devices such as fluid pumps, motors or valves. Inlet and outlet passages communicate a control pressure chamber to high and low pressures respectively. A control element totally within the chamber so as to have balanced pressure forces thereon and made of a magnetically sensitive material is moved to a fixed position in the chamber proportional to the strength of an externally generated magnetic field. At least one of the passages moves with the output member so as to be opened or closed by the control element relative to the other passage. The output member follows the control element automatically varying the pressure in the chamber to compensate for any variations in the external forces thereon. The output member includes a rod like element having a port in its side for one of the passages and the control element is a sleeve surrounding the rod and can be moved by any externally controlled means including the magnetic field or an external mechanical interconnection.

67 Claims, 24 Drawing Figures

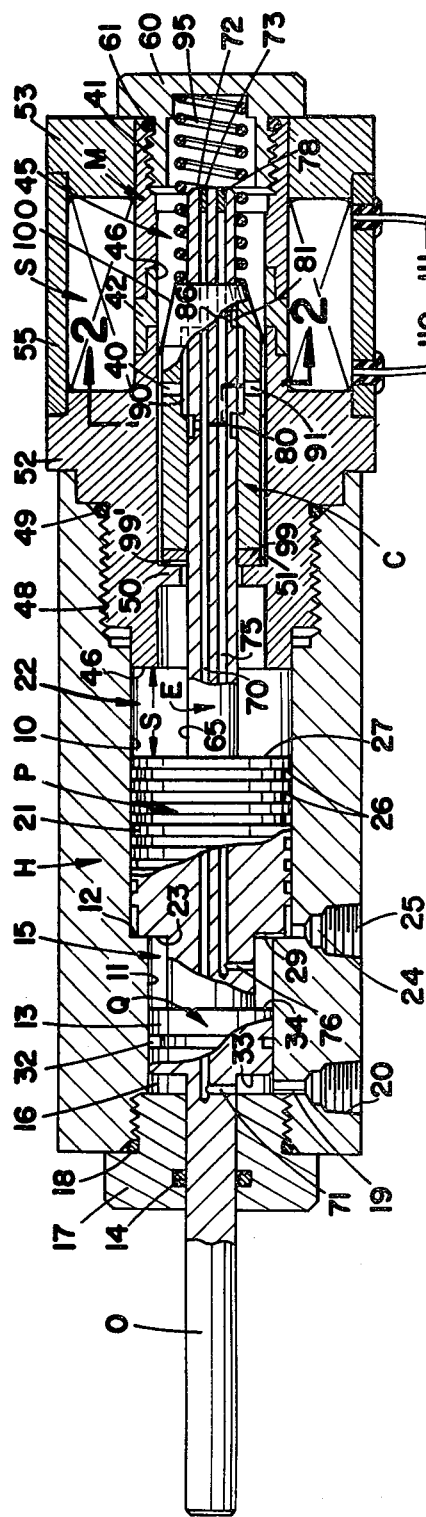

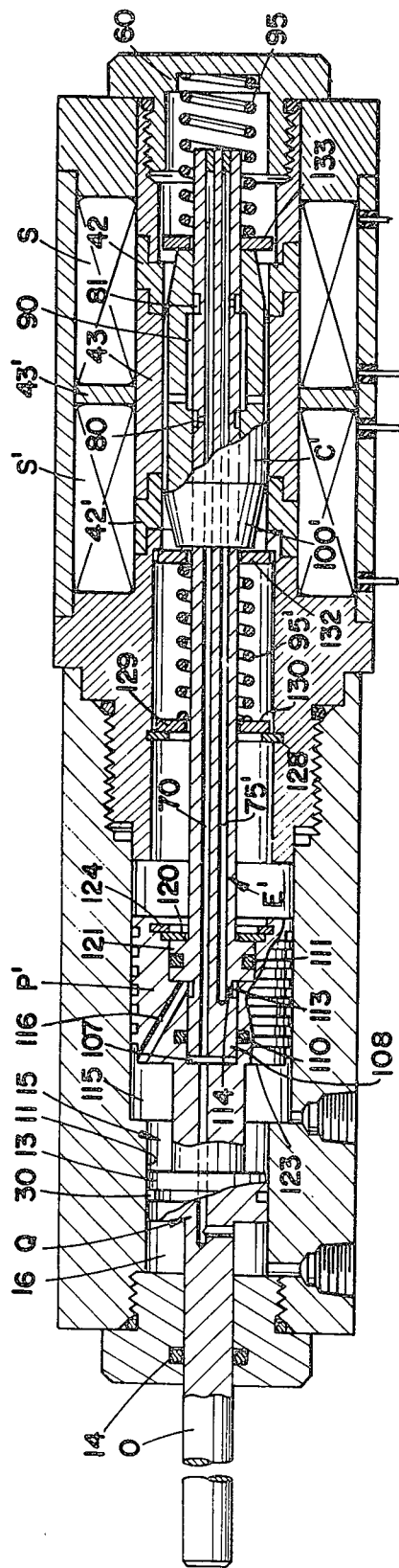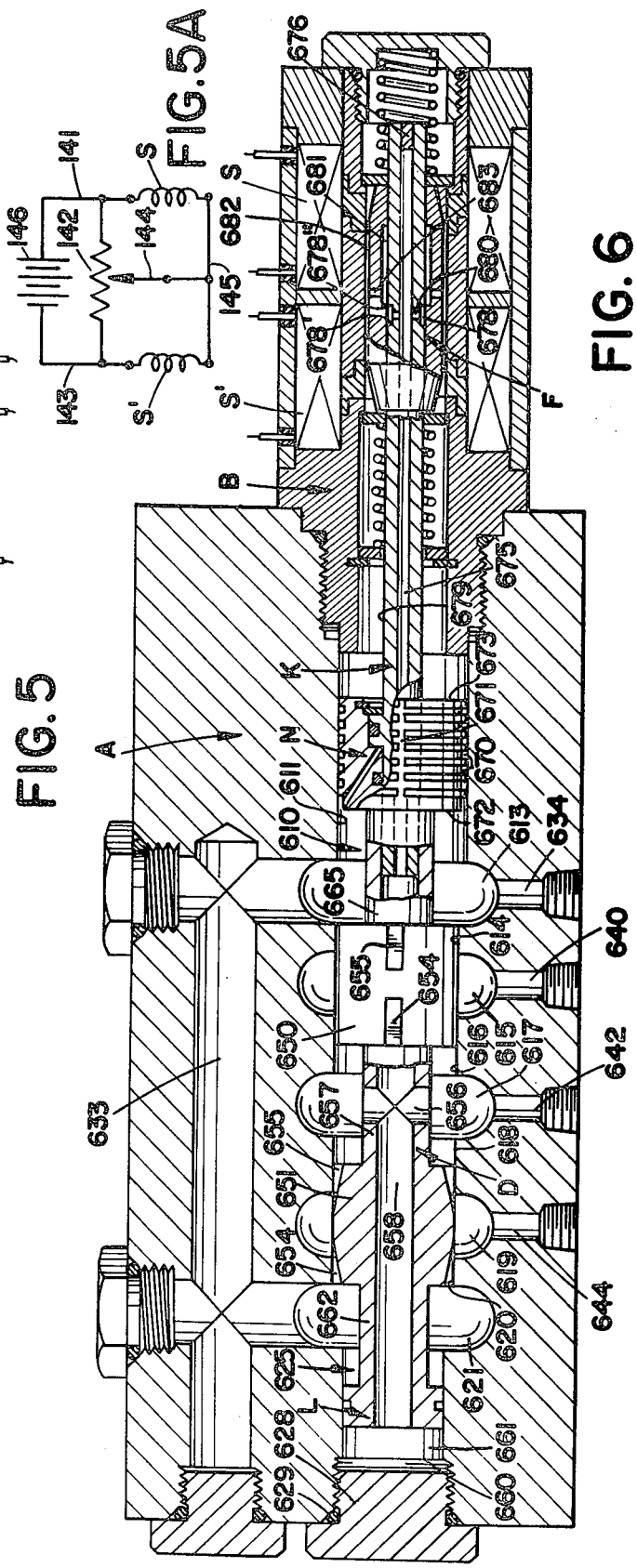

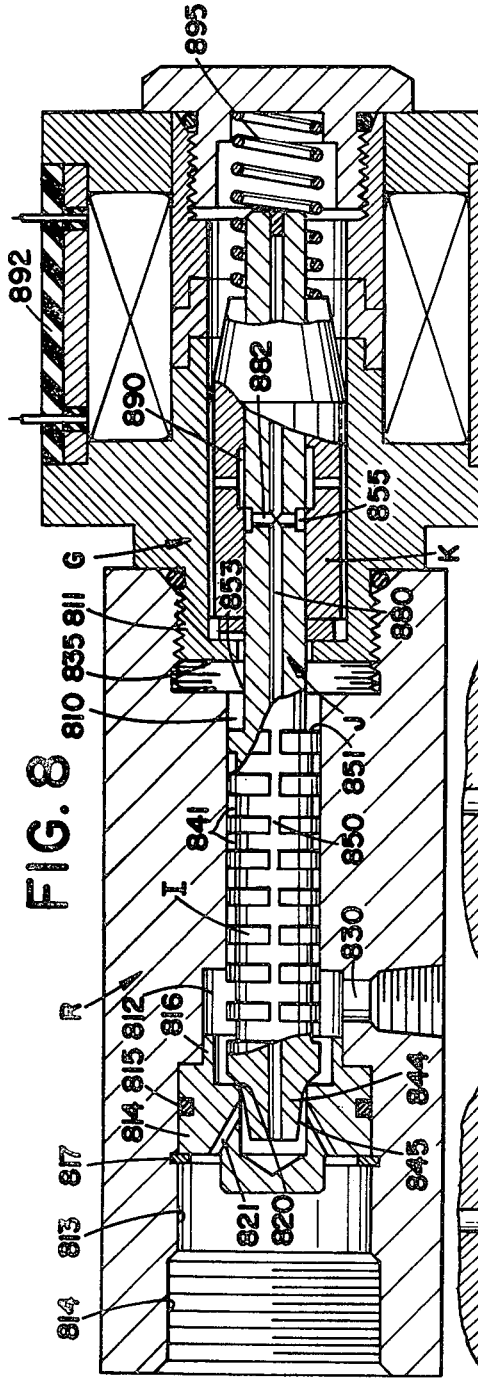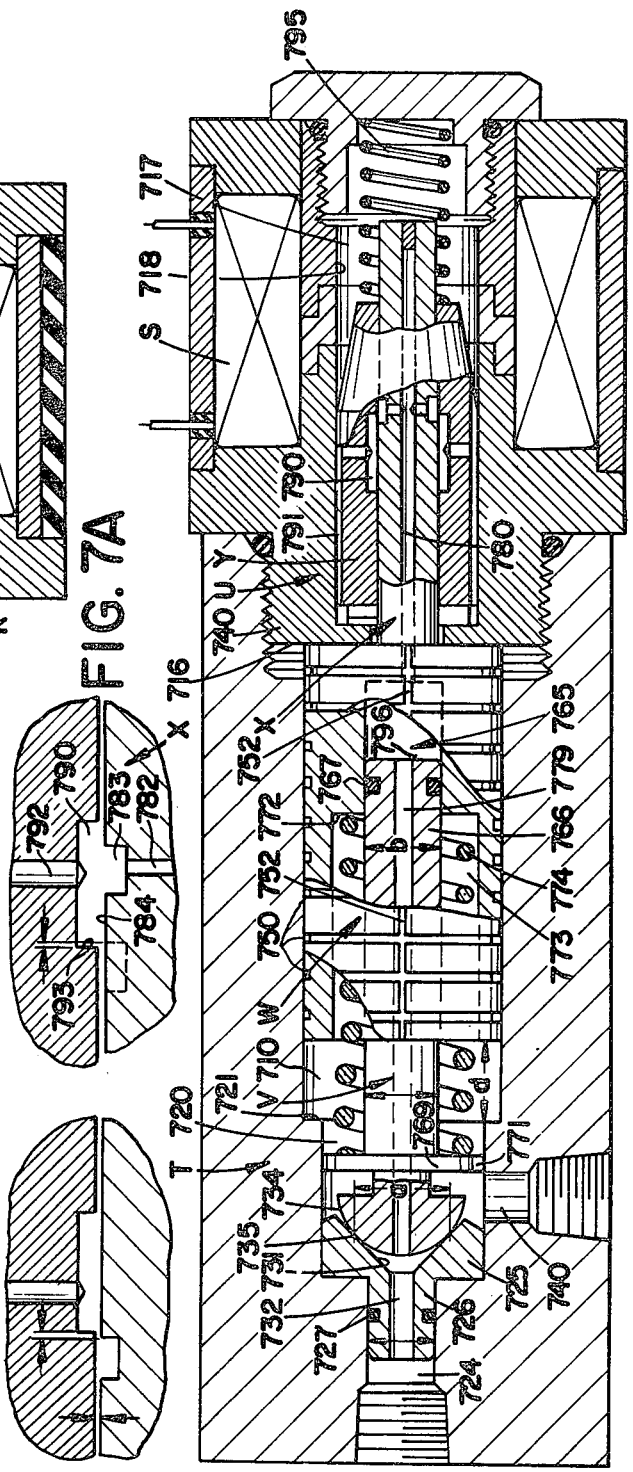

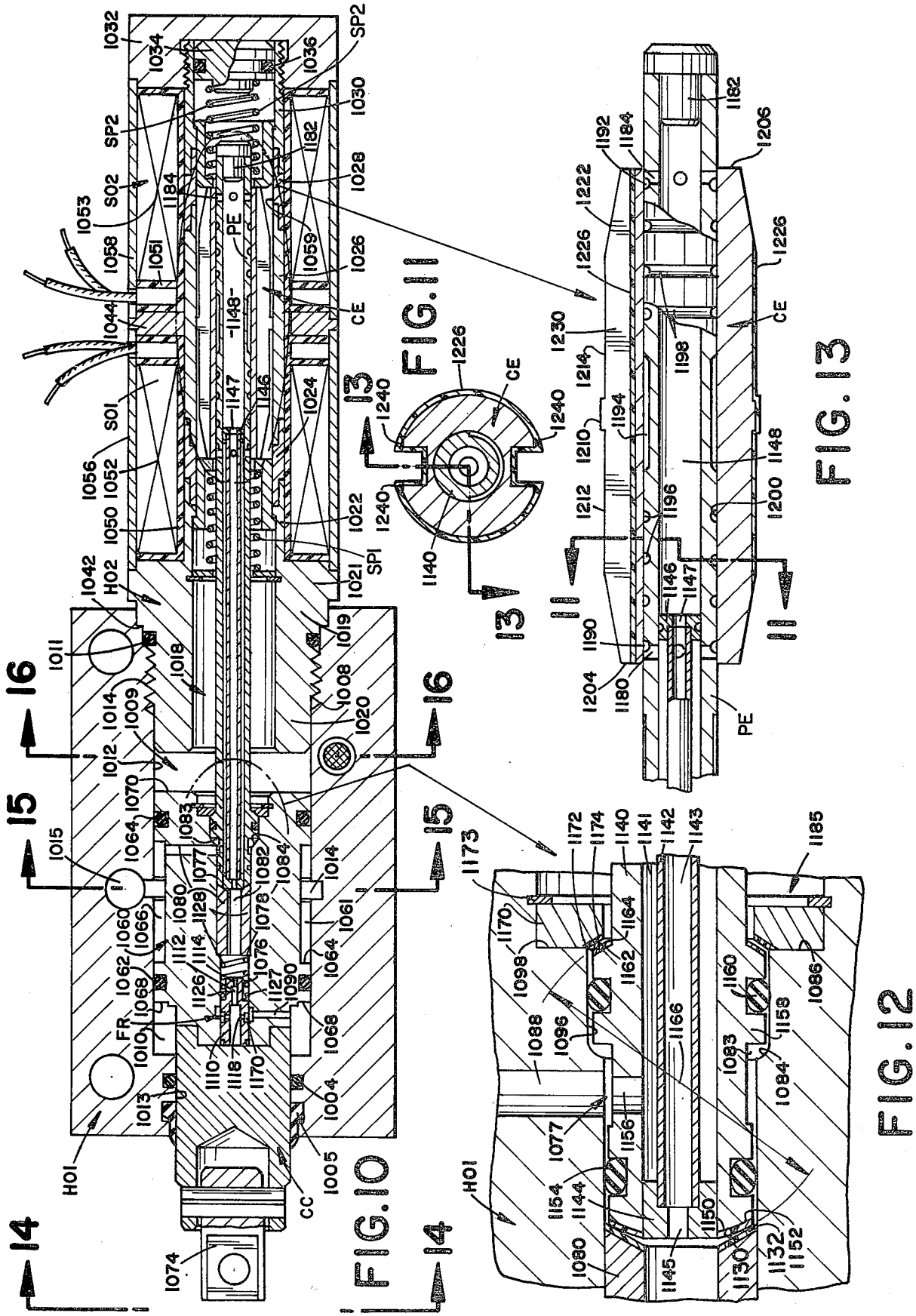

FLUID PRESSURE DEVICE

PREVIOUS HISTORY

This application is a continuation in part of U.S. patent application Ser. No. 205,214 filed Nov. 12, 1980, now abandoned, which in turn was a continuation in part of now abandoned U.S. patent application Ser. No. 189,913 filed Oct. 2, 1980 which in turn was a continuation in part of now forfeited applications, Ser. No. 051,843 filed June 25, 1979 and Ser. No. 051,844 filed June 25, 1979.

SPECIFICATION

This invention pertains to the art of fluid pressure energized devices and more particularly to an electrically controlled, fluid pressure energized device such as a power actuator, or a flow control, pressure control or directional control valve.

The invention is particularly applicable to the use of hydraulic pressures as the device energizing force and will be described with particular reference thereto although it will be appreciated that the invention has broader and other applications and may be used in conjunction with high pressure gasses and the movement of the operating member may be used to control any type of mechanical device such as valves, motors and/or pumps which require a substantial mechanical force to actuate or control and wherein the electrical control signal is relatively low powered.

BACKGROUND

There are many places in industry where a force actuator must be remotely controlled to exert a mechanical force sufficient to move an object short distances to a prescribed point and then hold the object at this point notwithstanding variations in the return force of the object of the actuator.

The object may, of course, be any variable weight or force, a motor or pump control, a valve control or the like and the term object is used in a broad generic sense.

Electric motors, electric solenoids and hydraulic pressure energized devices have been used in the past for this purpose, all with varying degrees of success.

Electric motors and solenoid actuators heretofore have offered the simplest type of remote control because only electric wires are required between the actuator and the controls, which latter can be either manual or automatic.

Electric motors must act through gear reducers and are consequently bulky, complicated, expensive and have an overly long total response time. They are otherwise desirable because the gear reducer is usually self-locking to retain the object in any adjusted position regardless of variations of the force of the object on the actuator. However, being self-locking, there is no automatic provision to return the object to its original position in the event of a power failure. Electric motor powered actuators are usually energized with pulses of electric power which must be accurately timed to determine the distance that the object is moved. These timers are complicated, expensive and thus undesirable.

Electric solenoids have a limited force capability for a given physical size and a relatively low force to electrical energy ratio, which energy in the form of an analog electrical signal must be continuously supplied. While solenoids are quick to react for a fixed energizing current, they are unable to hold the object at a fixed position when the force of the object on the actuator varies. To accomplish this latter, complex feedback circuitry is required.

Hydraulic pressure energized actuators are ideal for the purpose. They are capable of exerting very large physical forces for a minimum size. They easily hold the object in any adjusted position even with variations in the force of the object on the actuator. However, to remotely control such an actuator has always been a problem. Electric motor or solenoid actuated valves have been employed but with the difficulties above enumerated. Additionally, the actuator was required to have a control rod extending through packing glands in its housing, which rod then moves a member on the inside of the housing to effect an ultimate control of the operating member. Normally, the inside of the housing is at the high hydraulic pressure. In such a device, the packing gland exerts a substantial amount of friction on the control rod thus requiring substantial mechanical forces to move the rod. Furthermore, this friction, particularly with a solenoid actuator, provides a hysteresis loop in the response curve. Also, the gland must be constructed to withstand the full hydraulic pressures and oftentimes leaks develop necessitating maintenance. In addition, such leaks are always messy.

Consequently, it has been conventional with hydraulic actuators to pipe the high pressure hydraulic fluid from a pump to a remote control point, through manually or automatically actuated valves and then back to the hydraulic actuator. In such an arrangement, the distance that the hydraulic fluid has to travel can be extensive. The tubing or piping is expensive. Its installation with many bends therein is costly. Oftentimes, fittings or hoses are required to enable articulation of the actuated device relative to its support. When there are a large number of controls, a large number of pipes or tubes must be employed. The cross sectional area of all of these pipes or tubes can become excessive and bulky. Leaks develop both in the tubes, in the fittings and in the controls. Such leaks are expensive to repair and also messy, particularly when the leaks occur in the controls which are normally in a cab occupied by the operator.

Remotely controlled linear servo motors have long been known. They typically consist of an operating member mounted in a housing and an operating shaft extending through the housing. A null type servo valve is mounted inside the operating member and variably connects either pressure or suction chambers to a third variable pressure chamber.

The control element of the servo valve typically has a shaft protruding from the housing which is positioned by various externally energized force means. Since one end of the shaft is at atmospheric pressure, the other end has to be of the same diameter and vented to atmospheric pressure. This involves elaborate sealing arrangements and great difficulty in holding many ports in absolute concentric alignment particularly when they are substantially spaced apart. No alignment is ever perfect and this results in additional friction associated with the servo valve control element. The elaborate sealing also adds substantial friction in moving the element. This results in severe hysteresis in servo valves. The higher the hysteresis, the higher the force capabilities of the energizing means must be since the overall positioning accuracy can only be as accurate as the total hysteresis force divided by the energizing force. This invention overcomes these problems as well as teaching various additional means of reducing hysteresis friction.

U.S. Pat. Nos. 2,930,360 and 3,131,608 disclose electrically controlled servo motors. In the latter, an electromagnet positioned in the pressure control chamber moves a cylindrical control element to open and close pressure inlet and outlet ports (in the housing) to the control pressure chamber and vary the pressure therein. This control element is operatively associated with the operating piston through a tension spring which moves the control element substantially back to its initial position to restore the pressure balance. Such a device has proven commercially impracticable for various reasons, e.g. the electric coil is submerged in the operating fluid and its insulation is subject to deterioration in modern hydraulic fluids and its replacement is difficult. Further, it only works with spring return and the spring must have a fairly low spring rate. For high fluid pressures where large forces can be developed, physically large springs are required. Further there is a substantial hysteresis problem because of friction between the element and the housing.

The present invention overcomes all of the above difficulties and provides an arrangement whereby a fluid pressure actuator or servo motor may be accurately and remotely controlled by means of conventional electric wiring and an analog electrical signal rather than a timed pulse and the electrical signal may be of a relatively low power compared to the actual force delivered by the actuator.

In addition, the present invention provides an actuator or servo motor which has so little hysteresis and is so precise in its displacement for a given value of an electrical signal or other external force means that it can be used to precisely control fluid valves, e.g. flow, pressure or direction valves, and may also be used to control fluid pumps and/or motors both as to speed and/or direction of rotation. In other words, the present invention may be employed not only as a remotely controlled fluid pressure actuator but may be used as an integral part of a remotely controlled valve wherein the fluid pressure for energizing the actuator comes from the pressure of the fluids being handled by the valve.

The present invention is particularly applicable to the control of the relief pressures of pressure relief valves of the differential area type. Such valves have generally included a valve-member-actuating piston slidable in a cylindrical chamber having a low pressure outlet passage at one axial end of the chamber and a high pressure inlet passage through the side of the chamber. The piston has a valve closing member on its end which engages a valve seat surrounding the outlet passage and a cross sectional area greater than the area of the valve seat. High inlet pressure on this larger area, when the differential forces developed by the pressures were such as to exceed internal spring forces, moves the valve piston and the valve member away from its valve seat to permit the flow of fluid through the valve.

In such valves, the piston diameter is of necessity greater than the diameter of the valve seat in order that forces can be developed that will move the piston to the valve open position. As such, the sliding seal for the piston, which is usually in the form of an O-ring, has a substantial circumference in engagement with the wall of the piston chamber and thus has substantial amounts of friction therewith. In addition, the inlet pressures compress such an O-ring in a direction away from the inlet port, and in the case of very high fluid pressures, tend to extrude portions of the O-ring into the clearance between the piston and its chamber wall. With such an arrangement, the high friction of the O-ring is increased further, particularly as the piston moves from the valve open to the valve closed position. This all results in a hysteresis loop in the pressure vs. flow curve, and in the valve tending to bleed excessively at pressures slightly less than the preset pressure. This is undesirable.

Another problem with such valves has been that as the valve member moves away from its piston seat, the flow of fluid past the valve seat exerts a jet action in a direction opposite the opening movement with the result that the fluid flow opposes the opening movement of the valve seat resulting in a sloping or curved pressure vs. flow curve.

A further principal difficulty in such valves has been that the relief pressure is ordinarily varied by varying the compression of an internal spring by devices such as a control shaft extending through the housing wall which were moved either locally and manually or remotely by means of a gear motor to which is applied a variable length electrical pulse. Such gear motors are bulky, expensive and slow in their response time.

The invention is also particularly applicable to the control of fluid flow valves of the differential area piston type wherein fluid under high pressure is received and delivered at a controlled pressure to a fluid energized motor piston or the like notwithstanding variations in the supply pressure or loads on the motor. As such, the valve must be continuously responsive, opening and closing quickly to any changes. Also the valve should be readily controllable from a remote point. Electric motors and solenoids are undesirable for this purpose for reasons discussed above.

Another problem with such valves when the fluid is an oil is that the flow or output pressure varies with the temperature and/or viscosity of the liquid necessitating complicated feedback circuitry for sensing such changes and correcting therefor. Heretofore expensive means have been provided for heating or cooling the liquid to maintain its temperature constant.

The invention is also particularly applicable to the control of two or four way directional control valves. Heretofore, such valves to be remotely controlled required the use of either two pilot valves, one on each end thereof, or a large solenoid capable of exerting a force larger than the pressure forces developed on the side of the valve by the pressures being controlled. Additionally, such valves heretofore have always required a shaft or shafts extending through high pressure seals for the purpose of actuating the valve armature inside.

The invention may also be used to actuate a fluid pressure intensifier which must be remotely controlled.

As far as I am aware, no one has been able to successfully from a commercial standpoint electrically control the position of the actuating member of a fluid actuator or the opening, closing or flow through a fluid valve without a mechanical control rod extending through a high pressure seal and/or using an analog signal of relatively low wattage, e.g. less than ten watts and oftentimes less than five watts. Further, as far as I am aware, no one has ever employed a ported rod surrounded by a sleeve as the control element in a linear servo motor.

THE INVENTION

The present invention contemplates a new and improved arrangement for controlling the position of the output member of a fluid pressure energized device which overcomes all of the above referred to difficulties and others and enables such position to be readily controlled from remote locations by means of low power electrical signals, particularly analog electrical signals, and which arrangement can be incorporated in a variety of fluid pressure energized devices which require a controlled mechanical force such as fluid valves and other fluid powered devices.

In accordance with the broadest aspect of the invention, a fluid pressure energized actuator or servo motor is provided comprised of in combination: a housing member having a generally closed control pressure chamber and an operating member chamber; an operating member in its chamber having a surface exposed to pressures in the control pressure chamber and movable in the operating member chamber; inlet and outlet passages adapted to communicate the control pressure chamber with high and low pressures respectively with at least one of the passages being movable with the operating member; a control element totally contained within the control pressure chamber and operable when the operating member moves said one passage relative thereto to open or close the one passage relative to the other; the control element being made at least in part of a material such that it can be moved by a magnetic field; and, controllable magnetic means for moving the control element to controlled fixed positions relative to the housing member.

More specifically in accordance with the invention, an electrically controlled fluid pressure energized device is provided comprised of in combination: a housing member having a generally closed cylindrical cavity; an operating member movable in the cavity with one end defining with the cavity a closed control pressure chamber; a controlled component operatively associated with the other end of said member; inlet and outlet passages adapted to communicate the control pressure chamber with high and low pressures respectively with at least one of the passages being movable with the operating member and opening radially into the chamber; means restricting the flow of fluid through the passages, including a control element within the chamber and operable when the operating member moves said one passage relative thereto to open or close the one passage relative to the other passage; the control element being made at least in part of a material such that it can be moved by a magnetic field; and, controllable magnetic means for moving the control element to controlled fixed positions in the chamber.

The controlled component may be a shaft extending out of the cavity, a valve seat engaging surface, a spring biasing a valve seat engaging surface to a closed position, a piston, or the spool of a directional valve.

MAGNETIC MEANS

The magnetic means are normally external to and/or incorporated as part of the housing member and may be a permanent magnet, an AC and/or DC energized electromagnet, or multiphase AC electromagnets. In the event a permanent magnet(s) is employed, it must be external to and movable relative to the housing member and the housing member must be of a magnetically non-permeable material to permit the passage of flux therethrough. Also, the control element will then normally be a permanent magnet.

Preferably, the magnetic means is a solenoid coil(s) surround a portion of the housing defining a portion of the control pressure chamber and the walls of the chamber are comprised of axially spaced magnetically permeable portions and an intermediate magnetically non-permeable portion(s) to provide a magnetic air gap therebetween. The control element is positioned relative to the magnetic air gap(s) such that energization of a solenoid generates a magnetic flux which exerts an axial magnetic force on the control element which varies approximately linearly with the energizing current.

In the event only one coil is employed, the magnetic polarity of the coil is unimportant. In the event that two coils are employed, the electrical connections to such coils are such that the adjacent ends of the two coils are of the same magnetic polarity.

ENERGY SUPPLY FOR SOLENOIDS

If the solenoid(s) is energized from a D.C. power source, some A.C., either sinusoidal or preferably square waved, should be superimposed on the D.C. signal. This is conventionally called dither. If two solenoids are employed, the dither signal supplied to one coil in accordance with the invention is out of phase with the dither signal supplied to the other coil, particularly at the minimum voltage supplied to each coil at the neutral position which voltage must be at least equal to or greater than the dither peak voltage.

CONTROL ELEMENT

The control element is biased to a predetermined neutral position in the housing by means of a bias spring(s) and is made of a material such that it can be moved by a magnetic field. The control element is moved against the bias of the spring(s) a distance directly proportional to the strength or location of the magnetic field created by an analog type electrical signal with the superimposed dither supplied to the solenoid.

The control element, being totally within the control pressure chamber, has balanced axial pressure forces thereof and in essence is floating as to such forces. The control element can be moved without the need for anything mechanically associated therewith which would have to extend through packing glands in the side of the housing member.

Further in accordance with the invention, the control element is a sleeve biased by a spring(s) (preferably helical) to a first neutral position adjacent a first magnetically permeable portion of the housing when the coil is not energized and pulled against the spring bias past a magnetically non-permeable portion toward another magnetically permeable portion when the coil is energized.

NON MAGNETIC COATINGS

Also in accordance with the present invention, the control element has a maximum external diameter to provide a predetermined minimum clearance with the magnetically permeable walls of the control pressure chamber and the outer surface of the control element comprises a layer or coating of magnetically non-permeable material of a thickness at least twice the minimum clearance such that even if eccentric magnetic forces pull the control element radially, the ratio of the maximum magnetic air gap to the minimum air gap between the outer magnetically permeable surface of the control element and the chamber walls will usually be less than 2:1.

It is known that as the magnetic air gap approaches zero, the attractive forces rise asymtotically to a maximum at zero. By maintaining the ratio about 2:1, the adverse effects of a zero air gap are limited. Thus, the walls of the control pressure chamber can act to physically guide the control element without developing excessive side forces and stiction (static friction which is always higher than moving friction for the same pressure forces) therebetween. Preferably, the layer of magnetically non-permeable material on the outer surface of the control element is "Impreglon" (Trademark of Michigana Impreglon Co.) a polyfluoro elastomer, or Teflon (Trademark of DuPont Corp).

As the desired clearance is on the order of 0.0005 inches, at a ratio of 2:1, the thickness of the magnetically non-permeable material must be at least 0.001 inches. On the other hand it must not be substantially greater because as it is increased in thickness, it results in an undesirable magnetic air gap in the magnetic circuit, i.e., between one of the solenoid field poles and the control element, and also reduces the maximum total amount of magnetically permeable material in the circuit (i.e., the control element) either of which, or worse both, reduce the maximum axial force which can be exerted on the control element which is critical to the successful operation of the device. It is impossible to form (or to handle) sleeves of non-metallic materials having a thickness of 0.001 inches, 1/32 inch (0.03) being about the absolute minimum. Accordingly, in accordance with the invention, the magnetically non-permeable material is a self adhering coating (either sprayed on, electro deposited, dipped or brushed and dried or baked) on either the outer surface of the control element, the inner surface of the control pressure chamber, or both.

Thus "self adhering dried liquid coating" as used herein is intended to distinguish from a separately formed sleeve. Lubricated steel on steel, or teflon on steel has a coefficient of friction of 0.03 and 0.02 respectively.

I have found that Teflon on Teflon has a coefficient of 0.002 and a coating on both surfaces is preferred.

Further in accordance with the invention, the outer surface of the sleeve has a slight taper, in the case of a single solenoid coil toward the operating member and in the case of a double solenoid from the middle towards both ends, whereby the sleeve can have a slight rocking motion about its axis relative to the side of the cavity. A taper is relatively difficult to machine and, accordingly, the equivalent of such a taper can be obtained by providing a narrow band of the desired diameter and reducing the outer diameter of the sleeve elsewhere by 0.0010 to 0.0030 inches, the former being preferred.

Further in accordance with the invention, the advancing end(s) of the sleeve is tapered to limit the minimum magnetic air gap as the control element approaches the second field pole and further assists in providing a generally flat force-displacement curve on the sleeve for a given coil energizing current over its range of movement. As a helical coil spring has a sloping force-displacement curve, the two curves will intersect at a definitive point making the actual displacement of the sleeve against the spring bias quite sensitive to energizing current variations. Additionally the pole pieces(s) toward which the sleeve is pulled by magnetic forces are shaped so as to provide a radial magnetic air gap as the sleeve approaches the pole piece(s) and closes the air gap resulting in a longer potential displacement of the sleeve before the force begins to decrease.

PORTED STEM

In another major aspect of the invention, one end of the operating member forms one of the surfaces defining the control pressure chamber. This end has an elongated ported rod-like member or stem extending axially into the control pressure chamber, which stem has the inlet (and/or outlet) port(s) opening radially into the chamber from an internal passage(s). This stem with its port(s) moves with the member in partially sealed relationship relative to the control element to variably restrict the passage(s) one relative to the other.

The ported stem may be integral with but is preferably fastened to the operating member in such a way as to be slightly articulated relative thereto. This prevents the effects of misalignment in the type of a device where: all clearances are held to a minimum; tolerances are very small; and/or, exact alignment of spaced sliding surfaces is extremely difficult to achieve.

Further, the mode of fastening is such that the ported stem has an axially facing area exposed to high pressure so proportioned relative to the oppositely axially facing areas exposed to control chamber pressure so as to be in pressure balanced relationship when pressure in the control pressure chamber is at an optimum value between high and low pressure.

Preferably, these areas are so proportioned that the ported stem is in axial pressure force balance when the control pressure chamber is at approximately ¾ the difference between the high and low pressures. This ratio is selected because usually the operating member has mechanical forces thereon in addition to high pressure forces biasing it toward the control pressure chamber and this makes the ported stem in axial pressure force balance during a greater proportion of the time of operation. With the ported stem in such balance, there is little or no pressure force on the abutting surfaces connecting the stem to the operating member.

Further in accordance with the invention, the operating member on the side toward the control pressure chamber has a bore, and one end of the ported stem extends thereinto, such end being provided with a pair of oppositely facing annular surfaces which are segments of a sphere having a common center of curvature and the bore has a pair of annular surfaces facing the respective spherical surfaces whereby to provide the equivalent of a ball and socket connection between the ported stem and the operating member.

Further in accordance with the invention, these surfaces are coated with a low-friction type plastic material, e.g. Teflon (Trademark of DuPont), or preferably "Impreglon" (Trademark of Michigan Impreglon Co.) a polyfluoro elastomer and the bore surfaces are segments of a cone of an angle so as to be tangent with the spherical surfaces at the outer periphery thereof whereby to provide an extremely low coefficient of friction engagement therebetween.

All this helps reduce or eliminate radial forces of the stem on its surrounding control element and thus between the control element and the sides of the control pressure chamber. Radial forces create friction and friction results in undesired hysterises.

Further in accordance with the invention, the ported stem is comprised of a pair of spaced coaxial tubes with the inner tube being shorter than the outer tube and with its ends sealed to the inside walls of the outer tube, to provide inner and outer passages in the stem. A pair of axially spaced sets of ports are provided, one set being outlet ports and communicating the space between the inner and the outer tubes to the control pressure chamber, and the other set being inlet ports and communicating the control pressure chamber with the inside of the outer tube beyond the end of the inner tube and through the inside of the inner tube to high pressure.

To achieve radial pressure balance on the control element in accordance with the invention, each set of ports communicates with a circumferentially extending groove in the side surface of the ported stem and the control element is a sleeve surrounding the ported stem with its inner surface in close spaced (and thus partially sealed) relationship with the outer surface thereof and the length of this sleeve is at least greater than the maximum axial spacing of the walls of the inlet and outlet parts (or grooves) such that in one position of the sleeve both inlet and outlet ports will be partially blocked or restricted by portions of the sleeve overlapping the surfaces of the ported stem adjacent the ports.

Increased flow through one of the ports occurs when the sleeve moves to slightly open the port while the other end further blocks the other port. This of course results in a change in control chamber pressure which causes the operating member to move the ports back into their original partially blocked relationship.

Alternatively an internal groove may be provided on the inside of the sleeve of an axial length just less than the minimum axial spacing of the walls of the inlet and outlet parts (or grooves) and with the groove communicold to the outside of the sleeve and the control pressure chamber by a radial passage.

With either of these arrangements, the ports should be round or cylindrical and the walls of the grooves or the ends of the sleeve should be perpendicular to the axis. The orifice through which the fluid flows when the sleeve moves to open a port is thus a chordal segment of a circle. As the amount of overlap of the surfaces adjacent to the ports is critical, and it is possible to control the length of the sleeve more accurately than the width of an internal groove, the former is preferred.

Still further alternatively, the inlet and outlet ports can be in the form of axially spaced cylindrical grooves on the surface of the stem in combination with axially spaced cylindrical, radially extending passages provided through the sleeve walls, the axially adjacent walls of the passages being axially spaced a distance just greater than the spacing of the axially remote axially facing surfaces of the grooves to provide the necessary restricting action.

The exact axial spacing and diameter of these passages and the exact holding of the groove walls perpendicular to the axis is easily controlled in manufacturing.

It is believed that the combination of a sleeve surrounding a ported element or stem in a fluid pressure servo mechanism is in itself novel, has improved operating characteristics and is inventive regardless of the means for positioning it in the pressure chamber. Thus, conventional means extending to the outside of the housing for adjusting the position of the sleeve in the chamber may be employed, such conventional means including: a push/pull rod; a tension member; a rack and pinion; or, a threaded engagement between the sleeve and its housing with the control pressure chamber housing being rotatable relative to the operating member housing.

Thus, in a slightly narrower but important aspect of the invention, I have provided a fluid pressure servo mechanism wherein the control element is a sleeve surrounding a hollow ported rod (rather than the grooved spool movable in sealed relationship with a ported operating member or ported housing of the prior art), the sleeve being moved by any means including a magnetic field or an external mechanical interconnection.

The ported stem in accordance with the invention has a relatively small diameter (e.g. $\frac{1}{4}$ inch) in relation to the diameter of its associated piston. As such, for the same clearances between the sleeve and the ported stem, null leakage is reduced and is substantially less than in heretofore known servo motors using a spool or cylindrical control element where the diameter of the cylinder inherently had to be much larger and thus for a given clearance had a much bigger area for null leakage.

In operation, and in either event, the operating member moves the passage(s) or port(s) relative to the control element, however positioned, such that the pressures in the control pressure chamber exerting a force on the member will exactly equal other, including external, forces being exerted thereon. If the other, e.g. external forces are increased or decreased, the operating member and its port will move relative to the control element relatively opening one and closing the other passage. The pressure in the control pressure chamber will automatically change to compensate for such changes in the external forces. Inasmuch as the pressure change between the pressure chamber and the passage affected by the control element can vary over rather wide limits with extremely small relative movements, the result is that wide variations in external forces on operating member will cause wide variations in the chamber pressure with extremely small relative movements of the sleeve and stem.

If the sleeve is then moved to a new position within the chamber, the operating member will quickly move to restore the balance of the external forces to the chamber pressure forces thereon. In effect, the operating member is a slave exactly following the control element as it is moved relative to the housing member.

In accordance with the invention, the control element and passage(s) may be arranged so that on relative movement: either passage is opened or closed independently of the other; or the outlet passage may be restricted relative to the inlet passage and the control element only opens or closes the inlet passage; or, the control element opens one passage while closing the other one. In the latter situation, the operating member can move just as rapidly in either direction. In the former two situations, the operating member can move more rapidly in one direction than the other.

As heretofore indicated the control element is in axial pressure force balance because it is totally submerged in the control pressure chamber. It is extremely difficult to maintain the control element in radial force balance due to the pressure differences caused by fluid flowing through restricted possibly non-symmetrical ports, out of roundness of the stem and element; or by unbalanced radial magnetic forces. Any radial force results in friction (or even worse stiction) and thus hysteresis. To reduce friction between the stem and sleeve extreme and it is believed unique steps are taken. Friction is a function of surface smoothness and the nature of the abutting materials. The stem is usually of stainless steel.

Stainless steel is easy to machine. It can be centerless ground to a 40 RMS surface. Chromium is almost impossible to machine. It can be ground to 10 RMS. Accordingly, in accordance with the invention the stem is made of an easily machined metal and coated with Chromium. Coefficients of friction on the order of 0.03 can be obtained.

FIXED OUTLET PASSAGE

In another aspect of the invention, the outlet passage is permanently restricted relative to the inlet passage by a ratio in excess of 1,000:1 and the control element restricts the high pressure inlet port such that the operating member moves only the outlet port relative to the control element to a point where the flow through the inlet port exactly equals the flow through the restricted outlet passage.

Thus in this aspect of the invention, the restricted outlet passage is comprised of: a plurality of circumferentially extending grooves in the cylindrical surface of the piston and a single longitudinally extending groove from the control pressure surface to the low pressure surface forms a plurality of sharp-edged orifices between the chamber and low pressure. The pressure drop across each orifice is generally viscosity insensitive and the flow is proportional to the square root of the pressure differential. By employing a plurality of such orifices, the longitudinal groove can be wider for the same volume of fluid flow and thus less likely to become plugged or clogged by entrained particles of dirt in the fluid. In this way, extremely low flow rates may be obtained with a relatively wide longitudinal passage and the manufacture of a plurality of orifices is greatly simplified.

In either event, in accordance with the invention, the port(s) of the passage(s) being controlled by the control element opens in a direction perpendicular to the line of movement of the control element such that the control element is always in a pressure balanced condition not only in directions parallel to its line of movement but in directions perpendicular to its line of movement. This latter is accomplished by having the controlled port(s) open in at least two directions perpendicular to the line of movement of the control element and/or by providing circumferentially extending groove(s) communicating with the port(s).

Thus, except for the forces of gravity, friction and/or the bias spring(s), the control element is in a floating condition within the chamber and thus easily moved with minimum friction by any externally controlled means, e.g. magnetism from the energized solenoid.

USES

The movement of the operating member may be usefully employed to exert a mechanical force on any object or control a valve, actuate a switch, control another fluid pressure device, such as a pump or motor, bias the spring of another mechanical device and/or actuate a pump.

When controlling a flow control or pressure reducing valve wherein the outlet pressure of the valve varies, the outlet or low pressure port of the control pressure chamber communicates directly with the sump or some other constant low pressure rather than the variable outlet pressure of the valve.

FLOW COMPENSATING VALVE

The high pressure inlet port to the control pressure chamber is always located on the axial side of the low pressure port remote from the operating member such that if the high pressure port is suddenly opened by suddenly energizing the solenoid, high pressure fluid flowing into the control pressure chamber must then flow rapidly past the control element as the operating member moves to restore the pressure balance and enlarges the chamber. Such flow past the control element, tests have shown, can create a pressure differential between its ends causing it to move beyond (i.e. overshoot) the point dictated by the energizing current of the solenoid and then return to the position it would have moved to if the solenoid had been slowly energized. (Unequal rise and delay time of the currents in the coils of a two coil solenoid system may also cause or add to this problem).

To prevent this, in accordance with the invention, a pressure compensated flow regulating valve is provided, preferably within the operating member to limit the rate of in-rush of high pressure fluid to the chamber to a rate of flow equal to or less than the rate of flow past the control element which would create undesirable pressure differentials thereacross. While such a regulating valve tends to slow down the action time upon sudden energization of the solenoid, the amount of slowdown still permits a reaction time within acceptable commercial limits.

PRESSURE LIMITING VALVE

It has been found that using the actuator form of the invention to control high pressure hydraulic devices, if the actuator is supplied with the same high pressure as the device it can exert mechanical forces greater than the device can withstand.

In accordance with the invention the actuator is provided with a pressure limiting valve in its high pressure supply passage such valve including a spring-biased, differential area, sleeve piston with the high pressure entering the valve through the inside of the sleeve and passing through relatively movable raidal passages, (one on the support for the piston and the other on the sleeve) to the high pressure chamber for the piston.

DIFFERENTIAL AREA PISTON

In a further major aspect of the invention, means are provided for biasing the operating member toward the control chamber in the form of a piston of the differential area type with its end opposite from the control pressure chamber defining surface including a first surface exposed to low pressure and a second surface of a lesser area (preferably one-half) than the area of the control pressure chamber facing surface exposed to high pressure whereby the piston will move in one direction or the other determined by the difference in pressure forces created by the different pressures on each end of the piston acting on different areas. As microscopic changes in the restriction of one port relative to the other produce large changes in the pressure drop across the restriction, extremely precise positioning of the piston relative to the control element results.

MAGNETIZED VALVE SEAT

Further in accordance with the present invention, the inlet to the pressure chamber inlet passage is positioned adjacent to the base of a cup of magnetized material such that fluid flowing into such inlet moves through a tortuous path past such cup and any magnetic particles suspended in such fluid will be attracted to the cup and prevented from passing into the pressure chamber. The edges of the cup preferably form a valve seat and the flow into the cup is adjacent to and toward such seat whereby any particles trapped will be adjacent such seat and flushed away when the valve is opened.

TEMPERATURE COMPENSATED FLOW CONTROL VALVE

Further in accordance with the invention, and in a hydraulic flow control valve, the controlled component is a tapered valve seat engaging surface having high pressure thereon across the area of the valve seat, and a solenoid coil comprised of multiple turns of electric wire is provided for moving the control element to positions where the valve is opened controlled amounts in combination with means for maintaining the solenoid coil at substantially the same temperature as the hydraulic fluid. This results in a temperature compensated flow control valve. Such means may include heat insulation or an enclosed air space surrounding the coil.

Thus, for a given opening of the valve, the volume of flow therethrough will increase as the fluid increases in temperature and its viscosity goes down. At the same time for a given or fixed energizing voltage on the coil, its resistance and thus the current therethrough will drop with increases in temperature, resulting in the control element being moved a lesser distance and thus the valve being opened a lesser distance but maintaining the same volume of flow because of the decrease of the viscosity of the coil. By properly proportioning the resistance of the coil at ambient temperatures or using material for the wire having an appropriate temperature coefficient of resistance, almost complete temperature compensation of the valve, particularly at low valve openings where the problem of flow-temperature variations is most apparent can be obtained.

Further in accordance with the invention, the tapered nose of the flow control valve is concave to provide a decreasing variation in the valve opening versus increasing linear displacement of the valve seat engaging surface away from the valve seat, the degree of concavity being so proportioned relative to known leakages in a fluid motor to which fluid is being supplied as to compensate therefor. Such leakages are of the greatest effect on the motor at low fluid flow rates and low rotational speeds. The exact amount of concavity must be designed in relationship to the leakage characteristics of the motor.

PRESSURE RELIEF VALVE

Further in accordance with the invention, and in a pressure relief valve, the controlled component is a spring biasing a valve piston having a valve seat engaging surface adapted to be exposed to high pressure across the area of the valve seat toward a valve seat. The valve piston is variably biased to the valve closed position by variably compressing the spring against the valve piston as a result of appropriately positioning the control element.

Further in accordance with the invention, the valve piston of a pressure relief valve piston has a rod of a diameter smaller than the valve seat diameter having packing in its outer surface in slidable sealed relationship with a mating cylinder in the control pressure chamber piston. The friction of such packing, which is compressed toward the valve seat by the high pressure which it is sealing, is thus reduced as the valve piston closes reducing the hysteresis curve of the valve.

Further in accordance with the invention, the valve seat engaging surface of this pressure relief valve is curved and the valve seat is conical whereby as the valve seat engaging surface moves away from the valve seat, a smooth flow of fluid will result.

DIRECTIONAL CONTROL VALVE

Further in accordance with the invention, and in a directional control valve, the controlled component is the control spool of such valve, the control spool having a piston at the opposite end exposed to inlet pressure and an internal passage supplying the high inlet pressure to the piston pressure chamber and the operating member control pressure chamber.

With such an arrangement, the spool valve may be readily moved from neutral or mid position to either of its other positions without any mechanical member extending through the sides of the spool valve housing, either with or without pressure seals.

Further in accordance with the invention, the inlet to the high pressure passage in the spool is positioned diametrically opposite from the valve high pressure inlet passage whereby centrifugal force of the high velocity fluid entering the spool high pressure inlet chamber will prevent large dirt particles from entering the inlet of the high pressure passage.

PRESSURE INTENSIFIER

Further in accordance with the invention, the controlled component is a piston having an area smaller in diameter than that of the differential area of the operating member, which piston then acts as a pressure intensifier for the actuating pressure of the device.

SUMMARY

Fluid pressure actuated servo mechanisms are, of course, well known but in all instances to my knowledge, the control element has always been in the form of a grooved spool movable relative to inlet and outlet ports in the walls of the housing, such spool having an operating shaft integral therewith extending through the housing to where external control forces can be exerted thereon.

In effect, I have provided a fluid pressure actuated servo mechanism wherein the control element is totally within and pressure floating in a control pressure chamber and can be positioned in the chamber without any external mechanical interconnection by means of a magnetic field.

In operation, of course, the control element restricts the outlet of one passage relative to the other to produce a pressure in the control pressure chamber such that the flow rate therethrough is exactly equal in both passages. As the control element moves relative to the one passage when the piston moves relative to the housing and the control element can be moved to fixed positions within the chamber, it will be seen that the piston will always move relative to the position of the control element such that this flow rate condition exists.

If the outlet orifice and the control element have sharp, i.e. right-angled, opposed corners forming the restriction, there will only be one exact spacing of the corners where the flow rates are exactly equal. In effect, the piston and its associated outlet port will exactly follow the control element which is in a completely balanced condition insofar as both radial and axial pressure forces thereon are concerned and which has moved to a position such that the magnetic and bias spring forces thereon are balanced. Reduced sensitivity may be obtained by rounding the corners or tapering the sealing surfaces adjacent the corners.

DEFINITIONS

"High pressure" as used herein means any fluid pressure in excess of atmospheric up to and exceeding 3,000 pounds per square inch (psi) (210 bars) as may be in the conduits leading from a pressure source to a device embodying the invention.

"Low pressure" means any pressure below high pressure including atmospheric as may be in a conduit leading from the device, e.g. to a sump or to pressure operated equipment which the device of the invention is controlling.

"Control chamber pressure" means any pressure between high and low pressure as may be in the control pressure chamber and provides the force on the piston which performs the output work of the device.

"Relatively unrestricted passage" means a passage of a cross sectional area through which fluid under pressure can freely flow, e.g. at a 2,000 psi pressure differential at a rate of at least 1.0 gallons (231 in 3 or 3.8 liters) per minute. Notwithstanding this, even a relatively unrestricted passage restricts the flow of fluid in accordance with known principles and formula.

"Relatively restricted passage" means a passage of a cross sectional area small enough, or an orifice or orifices in an unrestricted passage, such as to restrict or inhibit the free flow of fluid therethrough. Normally the restriction will be such that with a pressure differential of 2,000 psi, the flow will be between 0.25 to 50.0 cubic inches (4.1 to 819 cm$^3$) per minute although it could be higher.

The degree of restriction in the restricted passage will control the rate of return of the piston to a retracted position and may vary over wider limits than those stated as long as it is always more than the amount of restriction in the relatively unrestricted passage when the control element is at its maximum opening of the unrestricted passage's outlet port to the pressure chamber.

"Magnetically permeable material" means a material having a magnetic permeability greater than air, i.e. greater than one. Usually such materials are alloys of iron, e.g. steel and some of the stainless steels, and may have a permeability of 150-20,000 or greater. Such materials are attracted by a magnetic field.

"Magnetically non-permeable material" means a material having a magnetic permeability the same as air and includes some of the stainless steels, aluminum, copper, plastic, hydraulic fluid and the like. Such materials are unaffected by the presence of a magnetic flux.

"Magnetic air gap" means a space in a magnetic circuit or loop filled with a magnetically non-permeable material.

"Control element" as used herein means a member or group of associated members capable of relatively restricting, i.e. opening or closing, the communication of one passage to the chamber relative to the other. Except momentarily, the communication of either passage will never be totally closed or totally opened.

"Operating member" means a piston, disc, diaphragm or other mechanical element which moves in whole or in part in response to control chamber pressure variations thereon.

"Controlled component" means a shaft extending outside of the housing, a valve seat engaging surface the spool of a multi position multi way valve, the spring of a pressure relief valve.

"Device" means and includes an actuator or a valve of any kind.

"Magnetically sensitive material" means either: a magnetically permeable material; or, a magnetically non-permeable material capable of being permanently magnetized such as the ferrites of barium or strontium and the like which have a magnetic permeability of approximately one but have the characteristic of being magnetizable and in such a state would be attracted or repelled by a magnetic field; or, an electrically conductive member in the presence of a moving, e.g. multiphase, magnetic field. It is important that the control element be at least influenced by a magnetic field.

"Totally within a chamber" means that no portion of the control element or anything operatively attached thereto extends through a wall of a pressure chamber such as to have different end pressure forces thereon. The element is thus exposed on all sides to the pressures in the control chamber and thus in effect is floating in the fluid.

"Pressure valves" include all fluid valves wherein a force is used to determine a pressure. Usually the force is applied by a spring. These include relief valves, sequence valves, pressure reducing valves, counter-balance valves and overcenter valves. A special case of this type of valve is a flow dividing valve which controls flow but does so by sensing pressure drop through an orifice and reacts through biasing springs. Thus, although it controls flow it is really a pressure type valve.

"Directional control valves" include two way on-off valves, two position-three way valves, two position-four way valves with spring offset and three position-four way valves. All these valves can have metering or non-metering spools and can readily be designed so that in a given position any, none or all of the ports can be open or blocked.

All of the above terms are in common usage in the fluid power industry today. For purposes of brevity solely, only one valve of each type will be described hereinafter, but anyone skilled in the art can easily apply the invention to all of the above referred to valves.

The mechanisms herein described in their operation pertain mainly to a relative non-compressible fluid (oil). However, anyone skilled in the art could easily, with minor changes, operate these devices with a compressible medium (air).

OBJECTS

The principal object of the invention is the provision of a new and improved fluid pressure energized actuating device which can be readily controlled by a low power analog electrical signal and wherein no portion of the movable parts of the actuator except the output shaft extend through to the outside of the actuator housing.

Another object of the invention is the provision of a new and improved fluid pressure energized actuating device which is simple in construction and provides a generally linear movement of the operating member in relation to an analog electrical control signal.

Another object of the invention is the provision of a new and improved electrically controlled fluid pressure actuator wherein the ratio of output force to the electrical control power is relatively high.

Another object of the invention is the provision of a new and improved fluid pressure actuator which does not require fluid pressure conduits to extend from the actuator to a remote control point.

Another object of the invention is the provision of a new and improved fluid pressure actuator which can precisely position the operating member of the actuator for a given electrical energizing current.

A further object of the invention is the provision of a new and improved fluid pressure actuator controlled by an analog electrical control signal which has a minimum of hysteresis.

Another object of the invention is the provision of a new and improved servo motor of the type described where for the same clearance between its control element and the associated parts, there is a reduced null leakage.

Another object of the invention is the provision of a new and improved device of the type described wherein the ported element is so attached to the piston as to not cause binding in the housings when clearances are held very close.

Still another object of the invention is a new and improved servo motor where the control element is in the form of a sleeve surrounding a member in which a port communicating pressure to the control pressure chamber is located.

Another object of the invention is the provision of a servo motor which has a minimum of hysteresis.

Still another object of the invention is the provision of a servo motor wherein the control element may be moved to any position therein with a minimum force exerted thereon.

Another object of the invention is the provision of a new and improved servo motor wherein its control element is not required to have an adjusting shaft slidable through a sealed opening in the housing.

Still another object of the invention is the provision of a new and improved electrically controlled servo motor wherein its control element is so spring biased in its control pressure chamber that a discreet movement of the electrical controls are required before the element commences to move.

Another object of the invention is the provision of an electrically controlled fluid flow valve which enables the variable control of relatively large volumes of fluid with relatively small amounts of electric power.

Another object of the invention is the provision of a new and improved electrically controlled servo motor wherein the electrical controls are so arranged that the control element is urged against its centering or neutral spring by a force just less than the initial bias force of the spring whereby sensitive control of the device may be achieved.

Another object of the invention is the provision of a new and improved fluid pressure actuator having means for trapping out magnetic particles which might be carried by the fluids into the control pressure chamber.

Another object of the invention is the provision of a new and improved electrically controlled fluid valve which can be readily installed in a conduit block for controlling the flow of fluid therethrough.

A further object of the invention is the provision of a mode of attachment and pressure sealing of a ported element to its operating piston where the element is in pressure balanced relationship and is radially movable relative to the piston.

Another object of the invention is the provision of a new and improved fluid pressure operated actuator wherein the pilot control element thereof is totally contained in a pressure chamber and has balanced fluid pressure forces thereon whereby a minimum force, magnetic or otherwise, thereon is required to move it from one position to another.

Another object of the invention is the provision of a new and improved servo motor which has a reduced null leakage.

Still another object of the invention is the provision of a new and improved fluid pressure actuator or servo motor of the type described wherein at least one of the fluid ports to the control pressure chamber is in the side of a small diameter rod and the control element opening and closing the port is a sleeve closely surrounding the rod.

Still another object of the invention is the provision of a new and improved fluid pressure actuated servo motor which is physically small in size for a given force output and can be economically manufactured.

Yet another object of the invention is the provision of a new and improved servo motor which can readily be used to control fluid valves, motors or pumps.

Another object of the invention is the provision of a new and improved servo motor wherein at least one of the passages communicate the control pressure chamber to external pressures through and movable with the operating member.

Another object of the invention is the provision of a fluid pressure energized servo motor wherein the control element is positioned by remotely located variable electrical resistance type controls, the spring biasing of the control element to the neutral position being so arranged that the feel of the manual operation of the electrical controls will be similar to the feel of the manual fluid controls of the prior art.

A further object of the invention is the provision of a new and improved arrangement for providing a plurality of sharp-edged orifices for restricting the flow of fluid which is simple in construction and inexpensive to manufacture.

Another object of the invention is the provision of a new and improved plunger movable inside of a solenoid coil so constructed and arranged as to limit the unbalanced radial magnetic forces thereon and thus excessive friction with an external surface.

Another object of the invention is the provision of a new and improved plunger for use inside of a solenoid coil wherein the ends of the plunger are so formed as to limit the minimum magnetic air gap and provide for a generally constant force-displacement curve on the member whereby the force-displacement curve of a biasing spring will intersect such curve at a sharply defined point.

Another object of the invention is the provision of a new and improved fluid flow control valve wherein the valve seat and valve seat engaging surface are so formed and constructed as to provide for a smooth flow of fluid past the valve as the valve is opened.

Another object of the invention is the provision of a new and improved fluid flow control valve wherein the packing sealing the valve seat engaging member is compressed by the pressure being controlled in a direction such as to reduce the friction of the packing as the member moves to the valve closed position.

A further object of the invention is the provision of a new and improved electrically controlled hydraulic flow control valve which automatically compensates for the decrease in viscosity of the fluid being handled as the fluid increases in temperature.

A further object of the invention is the provision of a new and improved hydraulic flow control valve wherein the shape of the valve seat engaging surface is such as to provide temperature compensation for the increased leakage of a hydraulic motor being controlled by the valve due to increases in temperature of the fluid and resultant decreases in viscosity thereof.

Another object of the invention is the provision of a new and improved construction of a control chamber for an electrically actuated control wherein the surfaces of the chamber are formed of spaced magnetically permeable portions separated by a magnetically non-permeable portion so as to provide a minimum air gap with a magnetically permeable member movable in the chamber.

Another object of the invention is the provision of a directional control valve which does not have an external control member extending through a pressure seal in the housing and which can be remotely controlled by an analog electrical signal.

Another object of the invention is the provision of a remote electrically controlled actuator or valve which will return to a predetermined safe position in the event of an electrical power failure.

Other and more specific objects will appear and occur to others upon a reading and understanding of this specification.

DRAWINGS

The invention may take physical form in certain parts and arrangements of parts, preferred embodiments of which will be described in detail in this specification and illustrated in the accompanying drawings which form a part hereof and wherein:

FIG. 1 is a cross sectional view partly in elevation of a magnetically controlled uni-directional fluid pressure actuator illustrating a preferred embodiment of the invention;

FIG. 2 is a fragmentary enlarged view of FIG. 1 taken approximately on the line 2—2 thereof;

FIG. 3 is a still further enlarged fragmentary view of FIG. 2 taken approximately on the line 3—3 thereof;

FIG. 4 is a schematic wiring diagram of simplified electrical circuitry for controlling the magnetic field of the device;

FIG. 5 is a view similar to FIG. 1 but showing a double acting fluid pressure actuator using a pair of solenoid coils for creating the magnetic field;

FIG. 5A is a schematic circuit diagram on an electrical control circuit for the double solenoid arrangement of FIG. 5;

FIG. 6 is a view somewhat similar to FIG. 1 but showing an alternative embodiment of the invention wherein the outlet passage is built into the surface of the control pressure piston and the actuator is controlling a spool valve;

FIG. 7 is a still further alternative embodiment of the invention wherein the actuator controls a pressure relief valve;

FIG. 7A is a fragmentary enlarged view of FIG. 7 showing the relationship of the pressure grooves without fluid pressure in solid lines and with fluid pressure in dotted lines;

FIG. 8 is a still further alternative embodiment of the invention wherein the actuator controls a flow control valve;

FIG. 8A is a fragmentary enlarged view of FIG. 8 showing the relationship of the pressure grooves;

FIG. 10 is a side cross sectional view of an improved and now preferred embodiment of the actuator shown in FIG. 5;

FIG. 11 is an enlarged cross sectional view of the encircled portion of FIG. 10 showing the pivoted pressure balanced connection of the ported stem to the piston;

FIG. 12 is an enlarged cross sectional view of the encircled portion of FIG. 10 on the line 12—12 of FIG. 13;

FIG. 13 is a cross sectional view of FIG. 10 taken approximately on line 11—11 thereof;

PREFERRED EMBODIMENTS

Figure 9:
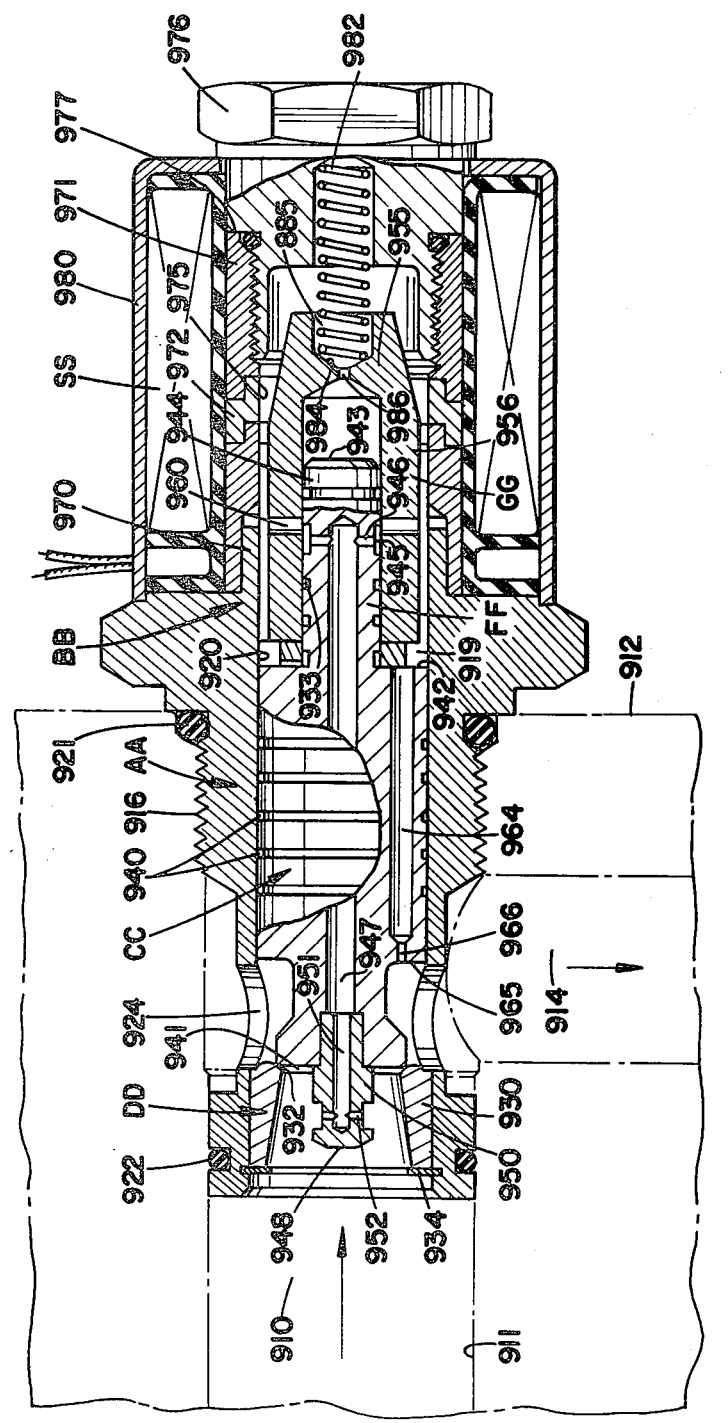
FIG. 9 is a still further alternative embodiment of the invention wherein the actuator is a cartridge valve to be assembled with a housing having inlet and outlet passages formed therein.
Figure 14:
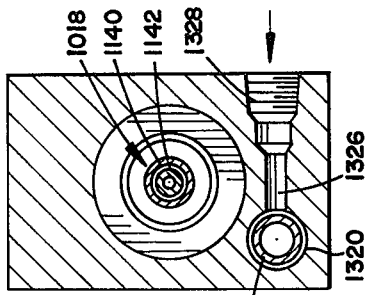
FIG. 14 is an end view of FIG. 10 taken approximately on line 14—14 thereof.
Figure 15:
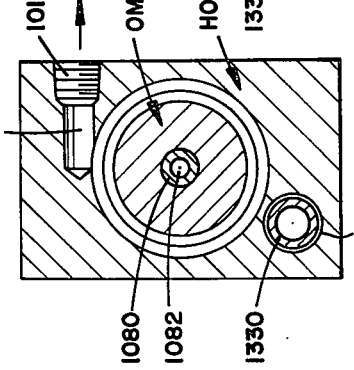
FIG. 15 is a cross sectional view of FIG. 10 taken approximately on line 15—15 thereof.

Referring now to the drawings wherein the showings are for the purpose of illustrating preferred embodiments of the invention only and not for the purpose of limiting same, FIG. 1 shows a magnetically controlled fluid pressure actuator comprised of: a housing formed generally in two parts, namely, a control piston housing H; and a control element housing M; a differential area piston consisting of a control pressure piston P and a high pressure piston Q slidably supported in the housing H and having an output shaft O; a ported element E movable with the piston P; a control element C slidably supported in the housing M in at least partially sealed relationship with the element E; and, a solenoid coil S adapted to create a magnetic field and move the control element C to relatively fixed positions in the housing M depending upon the energization of the solenoid S.

The piston housing H, part of the housing member of this embodiment of the invention, is generally in the form of a block or cylinder of metal having formed on the inside thereof a cylindrical cavity defined by cylindrical side walls 10 and a second contiguous axially aligned cavity of a smaller diameter defined by cylindrical side walls 11. The side walls are coaxial and the different diameters form a shoulder 12 which functions as a left-hand stop for the piston P.

The high pressure piston Q has an outer surface 13 movable in slidable sealed relationship with the walls 11 and divides the cavity on its right-hand end into a low pressure chamber 15 and on its left-hand end a high pressure chamber 16. Output shaft O slidably extends through a seal 14 in a sleeve nut 17 threaded into the left end of pressure chamber 16 and sealed by an O-ring 18. A high pressure inlet port 19 threaded at its outer end as at 20 to receive a hydraulic fitting (not shown) communicates with the high pressure chamber 16 at the left-hand end thereof.

In a like manner, the control pressure piston P has an outer surface 21 in slidable sealed relationship with the surface 10 and divides the cavity into a control pressure chamber 22 on its right-hand end and the left-hand end 23 faces the low pressure chamber 15.

Low pressure, e.g. a sump, is communicated to the low pressure chamber 15 through an outlet port 24 which is threaded at its outer end as at 25 to receive a hydraulic fitting (not shown).

The control pressure piston P is the operating member of this embodiment and is relatively conventional in construction, the outer surface 21 having a plurality of pressure balancing grooves 26 as is conventional in the art. The right-hand end 28 of the piston P forms a pressure surface facing the control pressure chamber 20 while the left-hand surface 23 forms a surface facing the low pressure chamber. One or a plurality of radial grooves 29 are provided in surface 23.

The pressure piston Q functions as a means biasing piston P toward the control pressure chamber. It is relatively conventional in construction and has one or a plurality of pressure balancing grooves 32 in the outer surface 13 thereof and a high pressure surface 33 facing chamber 16 and a low pressure surface 34 facing the low pressure chamber 15, all as is conventional in the art. The piston Q is either integral with or fastened to the control piston P. The shaft O may be integral with or fastened to piston Q. Its outer end (not shown) may be shaped to coact with the object to be controlled. The cross sectional area of piston Q minus the cross sectional area of shaft O is approximately 50% of the cross sectional area of piston P.

The control chamber housing M is the other part of the housing member of this embodiment and is comprised generally of a pair of axially spaced, magnetically permeable members 40, 41 separated by a magnetically nonpermeable member 42 which abuts at its axial ends the members 40, 41 in pressure sealed relationship. This may be done in a number of different ways, for example, by the use of O-rings, but in the embodiment shown the abutting members are appropriately rabbeted as shown and brazed together. The members 40, 41, 42 have a continuous cylindrical passage 45 therethrough defined by a cylindrical surface 46 which passage 45 in effect forms an extension of and defines part of the control pressure chamber 22 of the piston housing H.

The magnetically permeable member 40 is threaded into the piston housing H as at 48 and pressure sealed relative thereto by an O-ring seal 49. Its left-hand surface 46 provides a right-hand stop for piston P such that the maximum stroke s is the opening between surfaces 12 and 46 minus the axial length of piston P. In addition, the member 40 has a flange 50 adjacent its left-hand end extending radially inwardly into passage 45, which as will appear forms a left-hand stop 51 for the control element C. The right-hand end of passage 45 is closed by a cup-shaped plug 60 threaded into member 40 and sealed by means of an O-ring 61. The member 60 may be of magnetically permeable or non-permeable material.

The housing M and the portion of the housing H to the right of surface 27 of piston P contain the control pressure chamber.

Member 40 has a radially outwardly extending flange 52 and magnetically permeable member 41 has a magnetically permeable ring 53 abutting and extending radially outwardly in spaced relationship to the flange 52. Solenoid coil S is positioned between these radially outwardly extending portions. A sleeve 55 of magnetically permeable material surrounds the solenoid coil S with its ends in abutting, overlapping relationship with the radially extending flanges 52, 53. As such and in accordance with the invention, the control pressure chamber housing M forms a closed magnetic loop about the solenoid S except for the magentic air gap resulting from the member 42 being magnetically non-permeable.

The ported element E is in the form of an elongated rod of magnetically non-permeable material extending axially to the right from the surface 24 of control pressure piston P having an outer cylindrical surface 65. This element E may be integral with the piston P or may be separately formed and otherwise attached thereto (e.g. see FIG. 5). The outer diameter of the element E is approximately ¼ inch and less than the inner surface of the flange 50 to permit the free flow of fluid therethrough as the piston P and the element E move as a unit within the housings.

In accordance with the invention, means are provided for communicating the high pressure which is in chamber 16 to the control pressure chamber 22. Such means in this embodiment include an axial passage 70 extending from adjacent the right end of the element E through piston P and piston Q where it communicates with a radial passage 71 extending to high pressure chamber 16. The passage 70 which is normally drilled from the right end 72 of the element E is closed by a plug 73. In a like manner, in accordance with the invention, means are provided for communicating the control pressure chamber 22 with low pressure, such means in the embodiment shown including an axial passage 75 extending from adjacent the right-hand end of the element E through the control piston P where it communicates with a radial passage 76 opening into the low pressure chamber 15. In a similar manner, this passage has been drilled from the right-hand end of the control element E and the right-hand end is closed by a plug 78.

The element E has on its outer surface a pair of axially spaced, circumferentially extending grooves 80, 81 separated by a land 82 of an axial width approximately equal to the stroke s of piston P. The groove 80 is communicated with the high pressure passage 70 by means of a radial passage 84 while the groove 81 is communicated with the low pressure passage 75 by a radial passage 86. Groove 80 is defined by left and right radially extending side walls 80', 80'', respectively, the latter intersecting the outer surface 65 of ported element E with a sharp corner 87. Groove 81 has right and left radially extending side walls 81', 81'', respectively, the former intersecting the outer surface 65 with a sharp corner 88.

The control pressure chamber 22 except for the variable effect of control element C to be described is communicated with high and low pressure by axially spaced substantially identical grooves on the surface of the ported element E through substantially identical axially extending passages within the element E and the pistons P and Q. The piston P and element E are movable on a line of movement parallel to the axis of the piston P while the grooves 80, 81 form inlet and outlet ports to and from the chamber which face in a direction perpendicular to the line of movement of the control element C. It is believed that the arrangement of piston P and ported element E is novel and unique.

The control element C in accordance with the invention is slidably supported by surface 46 and arranged to simultaneously; restrict flow of fluid out of the inlet port groove 80 and open flow of fluid into the outlet port groove 81; or vice versa, outlet and inlet being used herein to designate the direction of flow of fluid into and out of the control pressure chamber 22.

In the embodiment shown, the control element C is in the form of a sleeve having an inner surface of a diameter to provide a small clearance f with the outer surface 65 of the ported element E and this inner surface is provided generally midway of the sleeve with a groove 90 communicated to the outer surface of the sleeve by a pair of diametrically opposite radial passages 91, which passages are in turn communicated to the axial ends of the sleeve by means of longitudinally extending grooves 93.

Groove 90 preferably has a width at least equal to the total stroke s of piston P. For a stroke s of 5/8 inch, the distance should be at least ¾ inch. Wall 90' is spaced from the left-hand end of element C a distance at least equal to the maximum movement of element C to the right which distance of movement is at least equal to the maximum movements of piston P.

Groove 90 has left- and right-hand radial side walls 90', 90" spaced a distance just less than (e.g. 0.002 to 0.004 inches) the width of land 82 and intersecting the inner surface of the element E with sharp corners 94, 96 facing corners 87, 88 respectively, to provide fluid orifices 97, 98, the widths of which inversely vary as control element C moves relative to ported element E.

The control element C is biased to the left by a small force, e.g. two pounds, by a helical coil spring 95 bearing at one end against the bottom of the cup of plug 60 and at the other end bearing against the right axial end of the control element C. The left-hand end of the control element C abuts against a ring 99 of magnetically non-permeable material which in turn abuts against the right-hand surface 51 of the flange 50. This ring 99 forms a magnetic air gap between flange 50 and control element C. One or more radial grooves 99' in the flange engaging surface provide communication of the pressure in chamber 45 with chamber 22.

Grooves 80, 81 are spaced from piston P so that land 82 is aligned with groove 90 when control element C is in the left-hand neutral position shown. There is a limited overlap of the corners and a limited leakage flow of fluid through the clearance f from the high pressure chamber through passage 70 into the groove 90 and then out through the low pressure 75 to the low pressure chamber 15. Groove 90 and thus chamber 22 will be approximately one-half way between high and low pressure. As such, pistons P and Q have balanced pressure forces thereon.

In accordance with the invention, the right-hand end of the control element C is tapered toward the end as at 100 for reasons which will appear hereinafter.

The control element C has a design clearance c of 0.0005 inch between its outer surface 103 and the inner surface 46 of the chamber 45 to enable the control element C to move readily in the control pressure chamber without an undue amount of friction. As shown in FIG. 3, the control element C is comprised of a magnetically permeable portion of an outer diameter d and an outer layer 105 of magnetically non-permeable material of a thickness t which in accordance with the invention is at least twice the design clearance c, e.g. 0.002 inch. The material 105 may be of any known magnetically non-permeable material such as copper, brass, stainless steel or the like but in the preferred embodiment is made of "Teflon" (a trademark of the DuPont Corporation) which material is known to have low friction characteristics.

The radial magnetic forces on control element C will almost always be slightly eccentric resulting in the element being pulled radially a distance equal to its design clearance until one point or line of the outer surface physically engages the wall 46. It is known that as two magnetically permeable surfaces are pulled toward each other by a magnetic field as the magnetic air gap approaches zero, the magnetic forces increase to a maximum by an asymtotic curve. By the use of the magnetically non-permeable coating or layer in thicknesses as stated, the ratio of the maximum air gap between the surfaces of the magnetically permeable material to the minimum air gap will never exceed 2:1. Radial forces between the outer surface of the control element C and the inner surfaces of the magnetically permeable members 40 or 41 will thus be limited. The clearance f between the inner surface of element C and the outer surface 65 of element E is preferably at least equal to clearance c to prevent these radial forces pulling the element C into friction pressure engagement with element E.

In the embodiment shown, when the control element C is biased to the left against the spacer 99 and stop 50, grooves 80 and 81 are both normally in equal restricted communication with groove 90. The axial width of groove 90 is preferably at least equal to its own and the full stroke distances of the piston P such that it will always be in communication with groove 81 even when the control element C is in the right-hand position and piston P is in the left-hand position.

There are substantial pressure drops across orifices 97, 98 and even in the null position, there will be a continuous flow of fluid therethrough which flow is directly proportional to the areas of the two orifices. The area of each orifice is equal to the clearance f multiplied by the circumference of element E. The diameter of element E is made as small as possible while still permitting the passages to be formed or exist. One-fourth inch is preferred which results in, for the same clearances, an orifice area less than that heretofore thought possible in linear servo motors which have always employed a grooved spool movable in a ported piston. A lesser null leakage results. Also, the elements are more easily held to accurate and concise tolerances and concentricity.

The passages 70, 75 are shown as drilled and parallel. Obviously, they would be formed by using spaced concentric tubes, the inner one for one pressure and the space between for the other pressure.

The solenoid S may take any one of a number of different forms which form no part of the present invention but will normally include a plurality of layers of copper wire suitably encased in an insulating medium and having a pair of terminal wires 110, 111 extending outwardly through insulators in the shell 55.

The solenoid S may be electrically energized in any desired manner from any type of an electrical power source which will supply the desired current in relation to the number of turns in the winding. In some instances, it is preferred that the power source for energizing the solenoid S be an alternating current source or in the alternative a combination of an AC and DC source. The slight pulsation of the resultant flux will provide a slight vibrating effect on the control element C helping to overcome stiction effects and eliminate any hysteresis which might be caused by such stiction. FIG. 4 shows a schematic including a power source 115 which may be AC, AC superimposed on DC or DC and a potentiometer 116 having one of its outer terminals 117 connected through wire 118 to one source terminal. The other outer terminal 119 is connected through wire 120, variable resistance 121 and wire 111 to the other source terminal. The solenoid S is connected by wire 110 to potentiometer arm 126 and the other terminal 127 connects to wire 111. As the potentiometer arm 126 is varied, current in the coil S can be varied from a minimum as determined by resistance 121 to a maximum determined by the resistance of the coil S and the voltage of the power source. In the alternative, the source could be a computer or any other source of an analog electrical signal connected directly to coil S.

Current through the solenoid S generates a magnetic flux which flows through magnetically permeable portion 40 into the magnetically permeable portion of the control element C that is across the magnetic air gap of the layer 105 to the magnetically permeable portion 41, then through the element C and across the magnetic air gap to portion 41. As the magnetic flux increases, the control element C is drawn to the right against the bias of the spring 95 to close this magnetic air gap.

Variable resistance 121 maintains a slight bias current in solenoid S when arm 126 is in the minimum energy action position shown, i.e. in contact with terminal 119 so that control element C is biased to the right an amount just less than the minimum bias force of the spring 95.

By tapering the advancing end of the control element E, the magnetic forces drawing the element to the right for any given energizing current can be made substantially constant over the entire range of movement of the control element. In other words, there is a relatively flat force versus displacement curve. Inasmuch as a helical coil spring such as spring 95 has a substantially sloping force versus displacement curve, the two curves will intersect at a sharply defined point making it possible for the control element C for a given energizing current in the solenoid coil S to always return to a sharply defined point within the chamber.

OPERATION

To describe the operation of the device, it is helpful to consider the interaction of the control element C and the ported element E as they move relative to each other, then the movement of the pistons P, Q due to the pressure forces thereon and then the movements of the two control elements relative to each other as caused by the movements of pistons P, Q.

Thus, as control element C moves relative to ported element E, the degree of communication of groove 80 to groove 90 is increased or decreased in proportion to the amount of relative movement while the communication of groove 90 to groove 81 is the inverse, that is it is decreased or increased. The degree of communication may be considered as a pair of variable valves or orifices in series between the high and low pressure with the groove 90 being the interconnecting passage and at an intermediate or control pressure. The flow through an orifice is directly proportional to the area of the orifice and the square root of the pressure drop across the orifice. Inasmuch as the flows through two orifices must be exactly equal, the pressure in the interconnecting passage, i.e. the groove 90, between the two valves must inherently adjust or vary up or down to a pressure such as to maintain this equal flow condition through both orifices. The pressure in groove 90 is fully communicated to the control pressure chamber 22 through groove 99' where it exerts a force to the left equal to the pressure times the area of piston P.

Piston Q also has high pressure on the surface 33 which has a lesser, e.g. 50%, area than piston P and this pressure exerts a force on the pistons to the right. If these forces plus or minus any external forces on the operating shaft O are not equal, the pistons will move in the direction of the higher force and will want to do so, even if against the shoulder 12 or the surface 65, until the forces are exactly equal and opposite.

By mechanically interconnecting the ported element E with the pistons, any movement of the pistons varies the communication of the two valves or orifices until the pressure in the control pressure chamber exerts a force to the left on surface 27 exactly equal to the high pressure on the piston Q and the external forces on the operating shaft O.

Very small relative openings and closings of the valves or orifices produce rather large changes in the pressure in the groove 90 and thus the control pressure chamber. Thus, the pistons will always almost exactly follow the control element C as it is moved to the right or left by variations in the energization of the solenoid S. Large changes in external forces on the shaft O, that is either a push to a pull, can result in large changes in the pressure in the control pressure chamber with only a very small movement, e.g. 0.001 inch, of the piston.

FIG. 1 shows the actuator at maximum fluid pressure and almost zero energizing current. In this condition, groove 80 is at high pressure and groove 81 is at low pressure. Groove 80 and 81 are in equal restricted communication with groove 90. There is thus equal pressure drops from groove 80 to groove 90 and from groove 90 to groove 81. Groove 90 and chamber 22 are thus at one-half the difference between high and low pressure. Inasmuch as the area of surface 27, which includes the cross sectional area of ported element E, is twice the area of surface 33, the pressure forces are balanced and pistons P, Q and ported element E are in the full left-hand position.

If the solenoid S is now energized by moving the arm 126 of potentiometer 116 to the left, that is toward terminal 117, more current flows in the solenoid S generating more magnetic flux in the magnetically permeable members 40, 41 which flux causes the control element C to move to the right against the bias of spring 95. As this occurs, groove 90 moves away from groove 80 and toward groove 81. As it does so, there will tend to be an increasing pressure drop between grooves 80 and 90 and a decreasing pressure drop between grooves 90 and 81. This increasing pressure drop between grooves 80 and 90 tends to reduce the pressure in control chamber 45 and thus the pressure forces on piston P to the left. The pressure forces to the right on piston Q remain the same. The pistons P, Q and ported element E move to the right until such time as the pressure forces on the three elements are again exactly balanced. If the control element C is continued to be moved to the right, the pressure will tend to further drop in groove 90 and chamber 22 and the pistons P, Q and element E will move further to the right to maintain the pressure forces on the pistons P, Q and the ported element E exactly balanced.

Absent any external forces on operating shaft O, for a constant high pressure, the control chamber pressure remains constant. The only think that changes is the position of the pistons, element E and shaft O as they follow control element C.

Extremely small relative movements of the grooves 80, 81 relative to the groove 90 can produce large pressure changes. The pressures in chamber 22 can go from almost high pressure to almost low pressure with a very small, e.g. 0.001 inch, movement of the pistons P and Q to counteract the effect of any external forces on shaft O.

In the event of a failure of electric power, the control element C will be moved to the left by the spring 95 and the pistons P and Q will then automatically move to the left-hand position shown in FIG. 1.

DOUBLE ACTING ACTUATOR

FIG. 5 shows a double acting fluid pressure energized actuator generally similar to the embodiment of FIG. 1 and only the differences will be pointed out. Like parts but with a different configuration will be referred to with the same number with a prime (') mark added.

In FIG. 1 the ported element E is shown as being integral with the piston P. In FIG. 5, the element E' is attached to the piston P so as to be radially movable relative thereto. Any misalignment of the axes of the two housings is thus accommodated.

Thus, the left-hand end 108 of the ported element E' extends relatively loosely into a bore 107 in the right-hand end of piston P' and is sealed by a pliant pressure seal 110. The element E' has a flange 121 spaced from the end 108 which has a pliant pressure seal 111 in its outer surface sealing against a counterbore surface. The left-hand end 108 intermediate these seals is provided with a circumferentially extending groove 113 which communicates through a radial passage 114 to the left-hand end of passage 75'. This groove is communicated to the low pressure chamber or cavity 115 by a passage 116 extending diagonally through the piston P' through the pressure surface 123. The left-hand end 108 is locked into the bore 107 by means of a washer 120 bearing against a right-hand facing shoulder of a flange 121 on the element E' and a split lock ring 124 fitting into a groove adjacent the open end of the bore.

In accordance with the invention, the flange 121 has an area twice that of end 108 and will be in pressure force balance relative to piston P'.

This same or similar radially movable pressure balanced construction can be employed on all the embodiments described herein.

Further, in FIG. 1 there is only a single solenoid. In the embodiment shown in FIG. 5 there are a pair of axially spaced right- and left-hand solenoid coils S, S' and a pair of magnetically non-permeable members 42, 42' inside of these coils in axially spaced relationship with a magnetically permeable member 43 therebetween. This member 43 has a radially extending portion 43' extending outwardly between the adjacent ends of the coils S, S'.

In this manner, both solenoid coils S, S' have a closed magnetic loop except for the non-permeable portions 42, 42' and the loop is closed through the control element C'.

The control element C' is generally identical in construction to the control element C of FIG. 1 except that the left-hand end is tapered as at 100' identically to the taper of the right-hand end 100 of the embodiment of FIG. 1 and for the same reasons.

Magnetically permeable portions 40, 41 are counterbored to 0.010 inch larger diameter to provide left- and right-hand facing shoulders spaced a distance apart preferably about 0.010 inch in excess of the axial length of the control element C'. A split lock ring 128 is positioned in a groove in the surface of this counterbore to provide a stop for a stainless steel washer 129 on the right-hand side thereof. The lock ring 128 is so located that considering the thickness of the washer 129, the spacing of the right-hand surface 130 of the washer will be the same distance from the shoulder as the base of the cup 60 is from the right-hand facing shoulder. A pair of washers 132, 133 are located one in each counterbore of a diameter as to be axially movable in the counterbore and abut the shoulders. Helical coil springs 95 and 95', one at each end of the control element C', bias the washers 132, 133 against the shoulders. The springs 95, 95' are preferably identical in construction and are under slight initial compression, e.g. about two pounds. With this arrangement, the springs 95, 95' do not have to be exactly identical in order to center the groove 90 in the control element C' relative to grooves 80, 81. Also as a control is operated to gradually energize one coil, there will be a slight dead spot in the movement of the control before the energization of the coil is sufficient to overcome this initial compression force and move the control element C'.

FIG. 5A shows a schematic wiring diagram for controlling the energization of coils S, S'. A potentiometer has a resistance element 142 having its outer terminals connected by wires 150, 151 to the respective terminals of a battery 146 and a terminal of coils S, S'. Potentiometer arm 144 is connected to both of the other terminals of coils S, S' by wire 135. Arm 144 is biased to the mid position shown by springs (not shown) as is conventional in the electrical control art. In this position, both coils are equally but minimally energized with opposite magnetic polarity and each exert an equal force to the right or left on control element C'. It thus remains in the center or neutral position.

The operation of the solenoids S, S' in conjunction with the control element C' are generally the same as that described with reference to FIG. 1. Thus, if the solenoid S is energized more than the solenoid S', the control element C' will move to the right and ported element E' and piston P' will move to the right in the same manner as that described with reference to FIG. 1. If the left-hand solenoid S' is energized more than solenoid S, the control element C' will move to the left and the ported element E' and piston P' will also move to the left. In the event of a power failure, control element C' will be returned to its neutral or center position shown by the springs 95, 95'.

Because springs 95, 95' are under an initial compression, arm 144 must move through a small arc in either direction before the magnetic force on element C' overcomes this initial compression and starts to move element C'. This provides a small null or dead spot in the control.

It will thus be seen that a single acting and a double acting electrically controlled fluid pressure energized actuator have been described wherein the only element extending out of a pressure chamber is the output shaft O. Further, the position of this output shaft can be readily controlled by an analog electrical current in one or the other of the solenoids. These solenoids create a magnetic flux which causes a control element *totally* within the housing of the actuator to move relative to inlet and outlet passages communicating a control pressure chamber to high and low pressures respectively. By moving the control element relative to the inlet and outlet passages, the pressure drops between these passages into the pressure chamber are varied. The differential area pistons in the actuator move under differential pressure forces exerted thereon to exactly follow the position of the control element as positioned by the magnetic forces. The pistons are then held in substantially the exact position relative to the control element notwithstanding variations in external forces on the output shaft of the actuator.

DIRECTIONAL VALVE

FIG. 6 shows the actuator of FIG. 5 incorporated into a remotely controlled type directional valve. Thus, in this embodiment, the valve is comprised of: a combined valve and piston housing A; a control pressure chamber housing B; a control pressure piston N actuating the spool D of the valve; a high pressure piston L; a ported element K; a control element F; and, a pair of solenoid coils S, S' for selectively moving the control element F to the right or left and causing the control pressure piston N to move the spool D to the right or left following movements of the control element F.

The housing A is generally conventional in structure and includes an elongated cylindrical chamber 610 having a cylindrical side wall 611 in which the piston N is slidably supported and a plurality of porting chambers separated by sealing lands which reading from right to left comprise: a low pressure chamber 613; a narrow land 614; an output/input chamber 615; a wide land 616; an input pressure chamber 617; a wide land 618; and input/output chamber 619; a narrow land 620; and, a low pressure chamber 621. The chambers are all the same axial width and the wide lands are twice the width of the narrow lands.

Adjacent to and communicating with the low pressure chamber 621, and in accordance with the invention, is a cylindrical cavity 625 of a diameter less than the diameter of the various lands and the chamber 610. The left-hand end of the chamber 625 is closed by a plug 628 threaded into the housing A and sealed by an O-ring seal 629. An internal passage 633 intercommunicates the low pressure chambers 621 and 613. Chamber 613 has a port 634 threaded at the outer end to receive a conduit fitting (not shown), which port 634 normally communicates to low pressure such as a sump or the like.

The chamber 615 has a port 640 threaded at the outer end to receive a conduit fitting which communicates to a port on a fluid pressure device to be operated. Input pressure chamber 617 has an inlet port 642 threaded at the outer end to receive a conduit fitting and is adapted to be communicated to a source of constant volume high pressure fluid. Chamber 619 has a port 644 threaded at the outer end to receive a fitting which is adapted to be connected to the other port of the fluid pressure device.

The spool D is comprised of a pair of cylindrical spools 650, 651 axially spaced a distance equal to the spacing of the two inlet/outlet pressure chambers and a length equal to the width of the chambers plus the width of one wide land. Spool 650 has a surface adapted to alternately engage the lands 614 or 616 and spool 651 has a surface adapted to alternately engage the lands 618 or 620. These surfaces are each provided with a pair of restricted taper passages 654, 655, one at each end, which increase in depth toward the axial ends of the spools to maintain as is conventional a continual inlet pressure and permit a limited flow of fluid, e.g. 30 gallons per minute, through the valve. This inlet pressure of course varies over wide limits as the loading on the device being controlled varies. These grooves 654, 655 are shown in cross section on spool 650 and in plan view on spool 651 for the purpose of clarity.

Depending on which lands are in sealing engagement, fluid will be directed through the valve from the inlet port to one of the outlet ports all as is conventional in the art.

High pressure piston L is integral with spool D and is slidable in sealed relationship with the walls of cavity 625 to form a high pressure chamber 661 with the right-hand surface of the plug 628.

The spool also has reduced diameter portions 662,665 defining passages for communicating the inlet/outlet chamber 619 to low pressure when the spool D is moved to the right and the inlet/outlet chamber 615 with low pressure when the spool D is moved to the left.

The spool has a portion 657 of reduced diameter and a passage 656 communicating the inlet pressure with an axial passage 658 which communicates high pressure to the right-hand end of the spool D and to the pressure chamber 661. Importantly passage 656 is diametrically opposite from inlet passage 642. Any entrained dirt particle entering through passage 642 would have to make a 180° turn at high velocity to enter passage 656 and thus the control pressure chamber. A tong and groove (not shown) is provided to prevent the spool D from rotating.

The piston N has a plurality of axially spaced, circumferentially extending, pressure balancing grooves 670 and in accordance with the invention an axially extending groove 671 communicating through the left-hand axial surface 672 and the right-hand axial surface 673. The groove 671 intersects with the circumferential grooves 670 and forms a plurality of square-edged orifices to provide a restricted passage from the control pressure chamber to low pressure.

The mode of attaching the ported element K to the pressure piston N is as shown in and described with reference to FIG. 5 and will not be further detailed herein. In the embodiment of the invention shown, because of the restricted passage formed by groove 671 from the control pressure chamber to the low pressure, it is only necessary that a single high pressure inlet passage 675 be provided in ported element K. Such passage extends axially through ported element K to a plug 676 at the right-hand end thereof. A groove 678 in the outer surface 679 of ported element K is communicated to the passage 675 by means of cross drilled openings 680. This groove is defined by left- and right-hand radially extending side walls 678', 678".

The control element F is generally identical in construction to the control element C described with reference to FIG. 5 and will not be further detailed herein except to say that it has a circumferential groove 681 in its internal surface communicated to a longitudinal groove 682 by cross drilled passages 683 so that high pressure in inlet chamber 617 can be communicated through cross drilled openings 656, axial passage 658, axial passage 675, radial passage 680, groove 678, groove 681, radial passage 683 and groove 682 to the control pressure chamber.

In this embodiment of the invention, groove 678 is so located that the right-hand wall of groove 678 and the left-hand wall of groove 681 have a slight overlap when the control element F is in the mid position shown when the solenoids S, S' are unenergized. The amount of overlap will depend on the restrictions in the outlet groove 671 and the clearance f. In any event, piston N will move the grooves relative to each other so that the flow therebetween will equal the flow through the groove or passage 671.

In the embodiment shown, the high pressure is also communicated from passage 658 to chamber 661 and this pressure exerts a force to the right on surface 660. The variable pressures in the pressure control chamber exert a force to the left on the piston N. Piston N moves the groove 678 relative to groove 681 to open and close the inlet passage from high pressure relative to the outlet passage to low pressure until the pressure forces are balanced on the piston N and piston L of spool D.

If solenoid S is energized, control element F is moved to the right, and pressures in the pressure control chamber tend to be reduced. Piston N and spool D follow control element F to maintain this pressure constant. This movement of spool D directs the flow of fluid to port 640. If the solenoid S is energized, the control element F is moved to the left and the piston N will also move to the left to move the spool D to the left causing a fluid flow to port 640. Variations in the pressures in inlet port 642 produce proportionate pressure changes in the high and control pressure chambers and do not adversely effect the force balances on the piston N and spool D.

If electrical energy should fail for any reason, the control element F will return to the neutral or mid position shown in FIG. 6 and the spool D will automatically return to the neutral position.

In this embodiment of the invention, the springs 95, 95' are so designed that their free unstressed length is greater than their length when installed in the device. Thus, these springs each exert an initial bias against the washers bearing against the ends of the control element F. With this arrangement, the potentiometer arms of FIG. 5A must move through a small arc to energize one of the solenoids sufficiently more than the other before the control element F begins to move against the initial bias of the spring. In this way, the operator has a slight dead spot in his hand control before further movement of the hand control commences to move control element F and the spool D to control the motor or piston which the device is being used to control.

Thus, it will be seen that a two way directional valve has been provided which can be remotely controlled by means of analog electrical current and which will be precise in its positioning of the lands of the spool relative to the lands of the housing and will give accurate control of the device which the spool valve is controlling.

PRESSURE RELIEF VALVE

FIG. 7 shows the actuator incorporated as part of a differential area piston type pressure relief valve. This valve is comprised generally of: a control piston housing T; a control pressure chamber housing U; a valve actuating piston V; a control pressure piston W; a ported element X; a magnetically actuated control element Y in the form of a sleeve; and, a solenoid S adapted to be connected to a variable source of electric power and depending on its energization to cause the control element to take a desired position within the housing U.

The housing T is generally in the form of a block of steel, aluminum or other high strength material having an elongated cylindrical chamber 710 formed therein in which the control piston W is slidably mounted and in turn slidably supports the valve piston V.

The housing U is constructed the same as housing B of FIG. 1 and will not be detailed here. Suffice it to say that it has a chamber 717 coaxial with and in communication with chamber 710 and is defined by cylindrical side walls 718. Otherwise like parts will be referred to by like numbers. The left-hand side of the magnetically permeable member 740 provides a surface 716 which acts as a stop to the right-hand movement of piston W, all as will appear. The left end of the chamber 710 is counterbored as at 720 to provide a right-hand facing shoulder or stop 721 for the left-hand end of piston W. The axial length of piston W is less than the spacing of these two stops by the distance d.

The left-hand end of the housing T has an inlet opening 724 on the axis of the chamber 710 in which a valve seat forming member 725 is positioned, such member having a cylindrical portion 726 in the opening and sealed by an O-ring 727. The opening 724 is internally threaded to receive a suitable fluid conduit fitting (not shown). The right-hand end of the valve seat forming member 725 has a conical valve seat surface 731 surrounding an inlet port 732, which surface 731 is adapted to be engaged by an arcuate valve seat engaging surface 734 formed on the left-hand end of the valve actuating piston V generally as shown. This surface 734 tangentially engages the conical surface 731 on a circle 735 having a diameter a determined by the radius of curvature of the surface 734 and the included angle of the conical surface 731. These dimensions are so chosen that the diameter a is at least greater than the diameter of the opposite end of the piston V exposed to high pressure and the diameter of portion 726 of member 725.

The circle 735 defines an area against which fluid pressure in the inlet port exerts a force to the right equal to the pressure times the left facing area.

Generally close to, but just to the left of, the valve seat forming member 725, an outlet port 740 threaded to receive a fluid conduit fitting (not shown) communicates into the chamber formed by counterbore 720. Normally this port will be at zero pressure and when the valve piston V moves to the right, it moves the valve seat engaging surface 734 away from the valve seat surface 731 and fluid can then flow from the inlet port past the valve seat 731 and out through the outlet port 740.

Control piston W has an outer diameter so as to be slidable in sealing engagement with the surface of chamber 710 and is provided with a plurality of generally rectangular, circumferentially extending pressure balancing grooves 750 as is normally conventional in the hydraulic art. However, in accordance with the invention, the outer surface is also provided with an axially extending rectangular groove 752 which intersects with each of the circumferential grooves 750 and communicates on the right end with chamber 717 and on the left end with the chamber 710, which chamber is in communication with the outlet port 740. The intersections of the grooves 750 and the groove 752 provide a restricted passage from the interior 717 of housing B to the outlet port 740 comprised of a plurality of sharp-edged orifices whereby any fluid flowing therethrough will flow at a rate which is viscosity insensitive and will have a pressure drop which is proportional to the square root of the pressure difference between the pressure in the chamber 717 and the outlet port 740, all as will appear. The dimensions of the groove 752 is preferably such that the leakage rate will be on the order of 0.25 to 1.0 cubic inches per minute at the maximum design pressure input to the valve. In practice, the circumferential grooves 750 will have approximate dimensions of 0.020 inch wide and 0.020 inch deep. The leakage groove 752 has a width approximately 0.030 inch and a depth of 0.020 inch. Obviously these dimensions may be varied in order to obtain the proper flow rates and pressure balances.

The piston W has an internal cylindrical chamber 765 in which the right end 766 of the piston V is slidably supported. An O-ring 767 in a groove in the outer surface of this right end 766 slidingly seals the opposed surfaces. The left-hand end of the piston V has a radial flange 769 of a diameter to be in sliding engagement with the surface of the counterbore 720 of the chamber 710 and this flange is provided with an axially extending groove 771 to permit the passage of fluid therethrough.

The left-hand end of the control piston W is counterbored to provide a shoulder 772 and space 773 for a spring 774, one end of which abuts against the shoulder 772 and the other end of which bears against the left-hand side of the flange 769. This spring 774 is the main pressure controller and biases the pistons V and W to the left and right respectively and the surface 734 into sealing engagement with the valve seal surface 731.

The piston V has an axial passage 779 which communicates the high pressure in the inlet port 724 to the right-hand end of the piston V and to chamber 765, which pressure is communicated through the clearance between the piston portion 766 and the wall of the chamber 765 to bear against the right-hand side of the O-ring 767. Chamber 765 is the pressure chamber of piston V and this pressure urges the piston V to the left and the valve closed position. This pressure also tends to compress the O-ring 767 in a direction toward the left, that is to say toward the valve seat 731. Importantly, in accordance with the invention, the cross sectional area of the portion 766 is less than the area of circle 735, the net area being such that pressures in the inlet port 729 will tend to force the piston V to the right. These forces are counteracted and opposed by the bias of the compression spring 774 as variably compressed by piston W.

In accordance with the invention, means are provided for varying the compression of the spring 774 by a remotely controlled electrical analog signal. Thus, in accordance with the invention, ported element X extends from piston W coaxially into chamber 717 and the control piston W and ported element X have an axial passage 780 therein communicating at the left-hand end with the chamber 765 and at the right-hand end with a cross passage 782. Passage 782 communicates with a cylindrical groove 783 in the surface 784 of the element X. The passages 782, 780 and 779 form in the absence of control element Y an unrestricted passage communicating the interior 717 of housing U with inlet pressure. Pressure chamber 717 exerts a force to the left on piston W equal to the cross sectional area of piston W less the area of chamber 765.

Control element Y is generally identical to control element C of FIG. 1 and will not be detailed herein other than to indicate that its interior surface has an elongated circumferentially extending groove 790 communicated with a longitudinal groove 791 in the outer surface by a cross drilled passage 792. As shown in FIG. 7A, groove 790 has a left-hand side wall 793 spaced from the left end of element Y a distance at least equal to its maximum range of movement to the right and a length such that it will substantially overlap groove 783 when there is zero fluid pressure and piston W is in the right-hand position shown to where it it will overlap groove 783 by a small amount, e.g. 0.005 inch, when the piston W has moved its full stroke d to the left under the influence of high pressure in chamber 717.

While most of the other devices described herein have a ratio of the net control piston pressure area to the net high pressure piston pressure area (differential pressure area ratio) of about 2:1, spring pressure controlled valve such as relief, pressure reducing, sequence, etc. need to have the spring force set well in advance of actuation. Thus, in FIG. 7 the net control pressure area is 7.5 times the net area of the control piston which is exposed to system pressure, rather than the 2:1 ratio of the other devices shown. The spring control devices are completely opposite to the other devices wherein an increase in magnetic flux will decrease spring force and it needs to increase the force only in one direction.

Control element Y is biased constantly to the left by the spring 795. Thus, there is normally a partially restricted flow of fluid into chamber 717 and a fully restricted flow of fluid out from chamber 717.

OPERATION

In operation, high pressure in the inlet port 724 exerts a force to the right against the area defined by circle 735 of the valve seat engaging member 733 and is communicated through passage 779 to exert a force to the left against the right-hand end 796 of the piston V. As the area of the right-hand end 796 is less than the area of the circle 735, these forces would normally move the piston V to the right. However, spring 774 biases the valve piston V to the left with a force equal to its spring characteristics and the amount of compression thereof. When the differential pressure forces on the piston V exceed the force of the spring, the valve piston V will move to the right thus restrictively communicating the inlet port 724 to the outlet port 740.

The inlet pressure is also communicated to the control piston pressure chamber 717 through the passages 779, 780, 782, grooves 783, 790, passage 792 and groove 791. This pressure is then bled off to outlet through the groove 752 which forms a restricted passage for the flow of fluid. As inlet pressure increases, the pressure in the chamber 717 also increases. The control piston W is moved to the left by the pressure on its right-hand end. As the control piston W moves to the left, it compresses spring 774 thus increasing the inlet pressure at which the valve piston V will be moved to the valve open position. The shoulder 721 limits the left-hand movement of the control piston W and thus the maximum compression of the spring 774. Depending upon the characteristics of the spring 774, the maximum relief pressure of the valve is thus determined.

When the solenoid S is energized, the magnetic flux causes the control element Y to move to the right against the bias of spring 795 and the element Y will remain in any one position as determined by the energization of the solenoid S. As the control element Y moves to the right, it restricts the flow of fluid out of the groove 783 to where the amount of fluid flowing into the pressure chamber 717 begins to be less than the amount of fluid flowing out of the pressure chamber 717 through the passages 752, 771. At this point, control piston W moves to the right due to the force of spring 774. The amount of compression of the spring 774 is reduced and the pressure at which the differential pressure on the valve piston V will move the valve to open position is thus reduced.

It will thus be seen that a valve has been described wherein the pressure at which the valve will open can be controlled by means of an analog electrical signal which analog electrical signal can be generated at any point remote from the valve and communicated thereto by normal electric wiring.

By appropriately positioning the control element Y, the compression of spring 774 can be controlled within limits and the opening pressure of the valve thus controlled between the maximum design opening pressure and a lower value depending on the spring's rate of spring 774 and the maximum range of movement of piston W.

In addition to this feature, the present invention has other advantages. Thus, it will be noted that the diameter of the O-ring 767 is less than the diameter of the circle 735 in contra-distinction to prior art differential pressure type valves wherein the diameter of the O-ring was always greater than the diameter of the valve seat. With the arrangement shown, the O-ring has substantially less area in engagement with its sealing surface and thus less friction therewith. The valve member V is freer to respond to pressure variations.

Furthermore, it will be noted that the high pressure on the O-ring 767 is always in a direction toward the valve seat as distinguished from prior art differential pressure piston type valves wherein the pressure on the O-ring was always away from the valve seat. This pressure, particularly if very high, tends to force portions of the O-ring into the clearance between the opposed surfaces. With the O-ring being forced into the clearance between the surfaces in a direction away from the valve seat, this further increases the friction against closing movement of the valve piston and provides a hysteresis in the pressure vs. valve position curve on opening and closing. In the arrangement shown, in accordance with the invention, closing movement of the valve piston tends to force the O-ring 767 from its extruded position making it possible for the valve piston to close with much less friction against its movement. Thus, the valve will not tend to bleed as excessively as with the prior art at pressures a bit less than the set relief pressure and will be capable of reseating after relief of pressure with far less pressure difference from the set pressure.

Another advantage of the present invention is that when the valve piston V moves to the valve open position, the flow of fluid through the inlet port exerts a jet action on the valve piston which encourages it to open rapidly and helps to provide an extremely flat pressure vs. flow curve for the valve.

The groove 752 intersecting with the grooves 750 to form a plurality of square-edged orifices is the preferred means of providing the restricted passage from the pressure chamber for the control piston D to outlet. Other types of restricted passages may be employed but these are not considered as desirable inasmuch as the flow through an ordinary passage of uniform diameter is proportional to the difference in the pressure between the inlet and outlet ends of the passage. With the square-edged orifices, as above pointed out, the flow is directly proportional to the square root of the pressure and generally independent of viscosity.

The valve is basically fail proof, that is to say, if the electric power should fail, the spring 795 will move the control element Y to the left which would cause the control piston W to move to the left and compress spring 774. However, the left-hand end of the control piston W engages the shoulder 721 to provide a stop for limiting the maximum compression of the spring 774. With this arrangement, if electrical power should fail, the valve will then go to its maximum relief pressure but never beyond. The important thing is that with the failure of electric power, the relief pressure of the valve does not drop to its mimimum which in some cases could be quite dangerous.

The arcuate surface 734 combined with a conical valve seat provides improved flow characteristics through the valve. Thus, this combination is such that the effect of eddy currents as the valve opens is completely eliminated resulting in a much flatter pressure vs. flow curve. This may be explained by the fact that eddying, as the valve opens and permits the flow of hydraulic fluid therethrough, occurs both at a lesser diameter than the diameter of the circle 735 (that is, the diameter of the true valve seat) as well as at a greater diameter. Eddying inside the true seat results in an area on the piston which is at lesser pressure than incoming pressure. Unless counteracted, this would result in a rising flow vs. pressure characteristic. Since areas are important, having an area available at a greater diameter than the true seat diameter on which eddying occurs dynamically and not at static seal, allows the design of a flat pressure vs. flow curve.

Thus, it will be seen that an embodiment of the invention has been described which provides a differential pressure type pressure relief valve which has highly improved operating characteristics and wherein its relief pressure can be readily varied from remote points by means of an analog electrical signal.

FLOW CONTROL VALVE

The invention is also particularly applicable to the control of fluid flow control valves wherein the output pressure must be maintained at a controlled value. Thus, FIG. 8 shows a differential area piston type flow control valve comprised generally of a piston and valve housing R, a pressure chamber control housing G, a valve piston I, a ported element J, a magnetically movable control element K and a solenoid S operable when energized to move the control element K to various positions within the housing G.

The housing R again is generally in the form of a block of steel, aluminum or other high strength material having an elongated cylindrical chamber 810 in which the piston I is slidable mounted. The chamber 810 is counterbored and threaded on the right-hand end to receive a threaded end 811 on the left-hand end of the control housing G. The left-hand end of the chamber 810 is counterbored as at 812 to provide what may be referred to as an output pressure chamber and counterbored again as at 813 to provide an inlet passage for the valve which is threaded as at 814 to receive a suitable conduit fitting (not shown). A valve seat member 814 sealed by an O-ring 815 is positioned in the counterbore 813 and has a locating flange 816 extending into the counterbore 812. A C-ring 817 fitted into a groove in the walls of the counterbore 813 locks the valve seat member 814 in position.

The valve seat member 814 is generally in the shape of a right-hand facing cup, the outer edges of which form a circular valve seat 820. A plurality of passages 821 extend from the left-hand surface of the valve member 814 to the inside of the cup thus formed to provide inlet passages from the high pressure in the counterbore 813. In accordance with the invention, the member 814 is of a magnetically permeable material so as to attract any stray magnetic particles in the fluid.

Just to the right of the valve seat forming member 814, the counterbore 812 has an outlet port 830 communicating therewith threaded to receive a conduit fitting (not shown). Normally, the cavity defined by the counterbore 812 will be at low pressure, such low pressure being that as determined by the valve itself as will appear.

The control pressure housing G is identical in construction to the housing M of FIG. 1 and will not be detailed further herein, it being noted that the left-hand facing surface 835 forms a right-hand stop for the piston I.

The piston I is comprised of a cylindrical body of a diameter to slidingly, sealingly engage the surfaces of the cavity 810 and as is conventional in the art is provided with a plurality of axially spaced, circumferentially extending, pressure balancing grooves 841. The left-hand end of the piston I has a valve seat forming portion 844 having a valve seat engaging surface 845 thereon which in the embodiment of the invention shown and for reasons which will appear hereinafter, tapers toward the left end in a progressively lesser amount such that the valve seat engaging surface may be said to be concave conically. With this arrangement, it will be appreciated that as the valve seat engaging surface 845 is moved to the right from the valve seat 820, the rate of change of the area of the opening relative to the linear movement of the valve seat will decrease in a non-linear fashion. As will appear, the shape of the valve seat engaging surface 845 may be appropriately designed for use with a particular fluid powered device so as to compensate for variations in leakages in such devices particularly at low speed as the viscosity of the fluid being handled by the valve decreases with increases in temperature of the fluid.

Importantly, the diameter of valve seat 820 is less than the diameter of the piston. Fluid forces on the left end of the piston I will exert bias forces to the right on the piston equal to the area of the valve seat 820 multiplied by the pressure.

The ported element J is in the form of a cylinrical rod extending to the right from the right-hand surface 851, which rod has an outer cylindrical surface 853 with a circumferentially extending groove 855 spaced from the surface 851 a substantial distance generally as is shown.

The control element K in this embodiment is generally identical in construction to the control element C of FIG. 1 both with relation to the walls of the pressure chamber and to the surfaces of the ported element and will not be detailed further herein. The groove 855 and groove 890 in the control element K are so axially positioned that when the control element K is biased to the left as shown and the valve seat engaging surface 845 is in engagement with the valve seat 820, the grooves overlap a small amount, e.g. 0.005 inch.

The piston I and ported element J have an axial through passage 880 therein communicating at the left-hand end with the inlet port 813 and at the right-hand end with a cross passage 882 which communicates with the groove 855.

The passages 880, 882, groove 855, groove 890 and the other passages heretofore described restrictively communicate the high inlet pressure in the counterbore or inlet port 813 to the control pressure chamber. This pressure acting on the right-hand end of ported element J and surface 851 (the area of both being greater than the area of the valve seat 820) creates a force to the left biasing the piston I into engagement with the valve seat 820 against the fluid pressure forces on the valve seat forming portion 844 of the piston I.

The body portion 840 of the piston I is so arranged as to form a restricted passage from the control pressure chamber to the outlet or low pressure cavity 812. In the embodiment shown, this arrangement is comprised of a longitudinally extending groove 850 in the surface of piston I which groove 850 intersects with each of the circumferentially extending grooves 841 to provide a plurality of square-edged orifices communicating the right-hand end of the portion 840 with the left-hand end and the cavity 812. The advantages and operation of this longitudinal groove 850 were described with reference to FIG. 6.

In operation, when the solenoid S is energized, the magnetic flux moves the control element K to the right against the bias of spring 895 and at the same time restricts the communication of groove 855 with groove 890 in the control element K resulting in a pressure drop in the control pressure chamber 810. When this pressure drop reaches a value such that the pressure forces to the left on piston I are less than the pressure forces to the right on the valve seat engaging surface 845, the piston I will move to the right moving the valve seat engaging surface 845 away from the valve seat 820. High pressure fluid can then flow through the opening thus created to the outlet port 830 from where it may flow to another pressure energized device (not shown).

For a given opening or spacing of the valve seat engaging surface from the valve seat, the flow of fluid and thus the pressure drop will vary with the viscosity of the fluid flowing through the opening. With some fluids, particularly the oils, the viscosity can vary over rather quite wide ranges with variations in temperature. The present invention automatically compensates for such changes in viscosity, e.g. ambient 70° F. to 180° F., a conventional oil operating temperature.

Thus, in accordance with the invention, the solenoid S and its magnetic circuit are so arranged and constructed that the control element K can be moved using relatively low electrical currents, e.g. less than six watts. Heat generated by these currents is minimal. Means are then provided for maintaining the solenoid S at essentially the same temperature as the fluid being controlled by the valve. Such means in the embodiment shown comprise means for conducting the heat of the fluid to the coil and thermal insulation surrounding the solenoid S to prevent cooling of the coil. This insulation may be an air gap or a layer of non-metallic insulation 892. Thus, as the temperature of the fluid in inlet port 813 varies, these temperature changes will be conducted through the metal of the piston housing R and the metal of the control pressure housing G to the solenoid S. The temperature of the solenoid S is substantially more influenced by the temperature of the fluid than internal heating from the energizing current.

The solenoid S is comprised of 1,400 turns of copper wire, which wire has a resistance at 70° F. of approximately 24 ohms which resistance will increase with temperature. Thus, for a fixed energizing voltage to the solenoid S, the current therein and thus the magnetic flux generated will decrease as the temperature of the solenoid S increases. The result is that the control element K will be moved to the left which in turn tends to close the opening between valve seat 820 and valve seat engaging surface 845. With the solenoid S receiving substantially greater amounts of heat from the fluid than is generated internally by $I^2R$ heat, almost complete temperature compensation for variations in the temperature of a hydraulic fluid being handled can be obtained. Greater or lesser compensation can be obtained by selecting metals for the wire having a different temperature coefficient of resistance.

The valve of FIG. 8 may be considered to be fail safe. Thus, if the electric power should for any reason fail, the control element K will move to the left by virtue of the bias of spring 895 which will raise the pressure on the right-hand end of the piston I to be equal to the inlet pressure and the differential areas will result in the piston I being moved to the valve closed position.

VALVE CONTROL CARTRIDGE

FIG. 9 shows a valve cartridge adapted to be sold as a unit and inserted into a conduit housing having a high pressure inlet passage therein and an outlet passage to which the flow of fluid is to be controlled. Such conduit housing is shown in dotted lines and includes a block of metal having a cylindrical passage 910 defined by a cylindrical surface 911 extending from a side surface 912 of the housing to a remote point adapted to be connected to a source of high pressure fluid. A cylindrical outlet passage 914 is also formed in the housing intersecting with the passage 910 at a point spaced from the surface 912. The passage 910 is threaded as at 916 to receive the valve cartridge as will appear.

The valve cartridge is comprised generally of: a piston housing AA; a control pressure chamber housing BB; a valve operating piston CC; a valve seat DD; a ported element FF; a control element GG; and, a solenoid SS which when energized moves the control element GG to the right to cause pressures in the cartridge to move the valve piston CC to the right and open the valve.

The housing AA is formed generally from a block of high strength magnetically permeable metal and includes an elongated cylindrical chamber defined by cylindrical side walls 920 which is threaded midway of its length to threadably engage the threads 916 of the conduit housing and is sealed by an O-ring seal 921. The left-hand end of the housing AA is adapted to be inserted into the passage 910 at a point to the left of the outlet passage 914 and is sealed by an O-ring 922. The housing between the seals 921 and 922 is provided with radial openings 924 communicating the left-hand end of the chamber 919 with the outlet passage 914.

Valve seat DD is a sleeve like member of magnetically permeable material having a valve seat 932 sealingly positioned in the left-hand end of the chamber 919. A lock ring 934 prevents accidental removal.

The control chamber housing BB is generally similar to that described with reference to the other embodiments and includes a pair of axially spaced, magnetically permeable members 970, 971 separated by a magnetically non-permeable member 972. These members are rabbeted and brazed together to form a pressure tight housing. These members have an axial passage defined by a cylindrical surface 975. The right-hand end of the passage is closed by a cup-shaped plug 976 threaded into the magnetically permeable member 970 and sealed by means of an O-ring 977. This plug 976 is formed of magnetically permeable material. The solenoid coil SS surrounds the members 976, 970, 972 and 971 and is enclosed by an outer shell 980 of magnetically permeable material which extends from abutting relationship with the outer surface of the plug 976 to abutting relationship with the main body of the housing which is also of magnetically permeable material.

The piston CC is of a diameter to slidingly, sealingly engage the surface 920 and as is conventional, has a plurality of axially spaced, circumferentially extending, pressure balancing grooves 940 in its outer surface. The left-hand end of the piston CC is provided with a valve seat engaging surface 941 of a diameter less than the diameter of the piston CC.

In the embodiment shown, control piston CC has a longitudinally extending passage 964 extending from its right-hand surface 942 through the left-hand surface 965 to communicate the control pressure chamber with the outlet or low pressure. The left-hand end of the passage 964 is restricted in diameter as at 966 to provide an orifice and a restricted flow of fluid through the passage 964.

The right-hand surface 942 of the piston CC has the ported element FF extending to the right therefrom and this surface 942 together with the right-hand surface 943 of the element FF constitute the pressure surface for moving the piston CC to the left. The outer surface 944 of the ported element FF has a circumferential groove 945 communicated by a radial cross drilled passage 946 to an internal axial passage 947 which extends from adjacent the end surface 943 through the left-hand end 948 of the piston CC. Axially spaced, circumferentially extending, pressure balancing grooves 953 are also provided in surface 944.

A plug 950 of magnetically non-permeable material extends into the left-hand end of the passage 947 and has an axial passage 951 communicating with cross drilled passages 952 which communicate the high pressure passage 910 with the passage 947 which in turn supplies high pressure to the groove 945. This plug has a left-hand facing surface 948 beveled at the outer edges to form a means for dividing and diverting a smooth flow of fluid toward the valve seat 932 when the valve seat engaging surface 941 is spaced therefrom.

Control element GG is generally in the form of a cup having a base 955 and side walls 956 having an inner diameter to slidingly and sealingly engage the surface 944 of ported element FF. In this embodiment the control element GG is slidably supported on the ported element FF rather than by the walls of the control pressure chamber.

The outer surface 958 of the control element GG is of a diameter less than the diameter of surface 920 so as to have a clearance to provide a passage communicating the pressure in groove 945 to the surface 942 and piston CC. The walls of the cup are provided with cross drilled openings 960 which communicates the exterior of the control element GG with the groove 945. In this embodiment shown, the openings 960 overlap the right-hand end of the groove 945 by about half the diameter thereof.

A spacer member 962 of magnetically non-permeable material is positioned between the left-hand end of the control element GG and surface 942 of the piston CC.

The control element GG is biased to the left by means of a spring 982 bearing at its right end at the base of the cup of the plug 976 and at its left end at the base 984 of a bore 985 in the right-hand end of the control element GG. A small opening or orifice 986 extends from the base 984 through the base 955 and in effect forms a dash pot to stabilize the movement of the control element GG relative to the ported element FF.

OPERATION

In operation, when the solenoid SS is energized from the circuit of FIG. 4, there is a small current in the coil creating a small amount of flux but insufficient to move element GG against the initial bias of spring 982. There is high pressure in the passage 910. This high pressure is communicated through passages 952, 951, 947, 946, groove 945 and 960 to the right-hand end of the piston CC. Inasmuch as the right-hand facing area of the piston CC is greater than the area of the valve seat 932, the piston CC is biased to the left. At all times, there is a restricted flow of fluid through these passages to the control chamber and thence through passage 964 and orifice 966 to the outlet passage 914, the volume of fluid being primarily controlled by the size of the orifice 966.

When the solenoid SS is further energized, the control element GG moves to the right restricting communication between the groove 945 and the passages 960. As this happens, pressure in the control chamber drops due to will move to the right thus opening the valve and allowing fluid to flow therethrough.

If it be assumed that fluid from the outlet passage 914 is being supplied to a hydraulic device, pressures will develop in the passage 914. The valve will then maintain a constant pressure differential between the input passage 910 and the outlet passage 914. If it is desired to increase or decrease this pressure differential, the solenoid SS is either energized or de-energized resulting in the control element GG moving to the right or left and the valve seat engaging surface being moved further away from or closer to the valve seat 932.

The valve seat DD and housing AA and BB are of magnetically permeable material and the exciting current in solenoid SS is sufficient to create a magnetic field around and adjacent valve seat engaging surface 941. This field attracts and traps adjacent seat 941 any stray magnetic particles in the restricted flow of fluid entering passage 952. When there is subsequently a flow of fluid through the valve, these particles are flushed away.

SUMMARY

In all of the embodiments described, a housing in effect has two parts, namely, an operating member housing having a high pressure cavity and a control housing defining a generally closed pressure chamber. These housings may be either integral or made separately and fastened together with a pressure tight seal. An operating member has a surface exposed to pressure in the control pressure chamber and is movable in its housing against opposing forces under the influence of such pressure to positions almost exactly determined by a magnetically positioned or magnetically movable control element. This operating member may then: move an output shaft extending out of the housing; compress or relax a spring associated with a fluid valve; operate a spool valve; operate a valve engaging seat forming an integral or separate part of the member; reciprocate the piston of a pump; or, any other operation requiring a short, e.g. less than two inches in one direction, but powerful stroke.

In FIGS. 1, 7 and 8 because the two housings are manufactured separately and assembled, maintaining exact axial alignment of the two chambers can be difficult. The operating member is slidably supported in one housing. The control element is slidably supported in the other housing and closely surrounds the ported element. If alignment problems arise, the method of attachment of the ported element to its operating member shown in FIGS. 5 and 6 may be employed.

Electro magnetically controlled needle valves have been hertofore known. However, because of the hydraulic forces on the valve armatures, large amounts of electric power are required to control the flow of even small amounts of fluid, e.g., in one known device 12 watts for 0.5 gallons maximum per minute at 3,000 psi, a ratio of 24 watts per gallon. Also, such valves are either full on or full off.

Also, the maximum rate of flow is so small that it can normally only be used to further control a pressure actuated main valve which then handles the larger volumes of fluid required by the fluid powered devices being controlled. With the present invention, it is anticipated that the valve may control sufficiently large volumes of flow that the flow may be used directly to actuate a fluid powered device without an intermediate valve.

It is anticipated that the present invention will require 10 watts maximum to variably control in excess of 30 gallons per minute (gpm), (a ratio of less than 0.30 watts per gallon) with an infinitely variable range between 0.25 cubic inches per minute to the maximum in excess of 100 gpm.

As an actuator or servo motor, it is anticipated that the device using 3,000 psi and a two inch diameter operating member will readily control in excess of 9,000 pounds of force with the same 10 watts of power, a ratio of 1,500 pounds per watt. Using larger diameters, even greater ratios can be expected.

Further, using the actuators of FIGS. 1 and 5, it is possible to cause the operating member (or piston) to reciprocate by continuously changing the magnetic force on control elements C or C' respectively. This may be done by: oscillating the potentiometer control arm(s); or, oscillating a permanent magnet surrounding the control chamger; or, switching the power on and off to the solenoid of FIG. 1; or, switching the power from one solenoid to the other in FIG. 5.

The reciprocation of the piston may then be used to actuate a piston pump.

In the alternative and as a pressure intensifier: the passage 71 may be omitted; and, high pressure communicated to passage 70 by other known means; and, chamber 16 provided with an inlet port connected to high pressure through a check valve and an outlet port connected through a check valve to a device requiring intensified pressures above high pressure.

Magnetic means are preferred to control the position of the control element in the control pressure chamber. Such an arrangement is simple, requires little electrical power and is easily remotely controlled through simple electrical wiring and electrical control. If permanent magnet means are employed externally of the housing, then the control element should preferably be a permanent magnet and the housing surrounding the element must be of magnetically non-permeable material such as austinetic stainless steel.

In the alternative, it is believed that the control element in the form of a sleeve surrounding a ported element in which one of the passages to the control pressure chamber is located is novel and useful. As such, patentable novelty exists in the combination of a sleeve control element surrounding a ported rod and other known mechanical positioning means such as: a push-/pull member; a rack and pinion arrangement wherein the rack is mechanically interconnected to the control element and the pinion is rotated by a shaft extending through the control pressure chamber housing; or, the control pressure chamber housing may be rotated relative to the operating member housing with threads movable with the housing engaging threads associated with the sleeve control element.

Referring now to FIGS. 10–18, there is shown an electrically controlled, fluid pressure energized actuator similar to the embodiment of FIG. 5 but including certain improvements made in the course of developing and testing the embodiment of FIG. 5 which now represents a preferred embodiment and which improvements are believed to be novel and produce unexpected and improved results.

The actuator shown in these figures is comprised generally of: a housing having an elongated cylindrical cavity therein, a pair of solenoid coils SO1, SO2 surrounding the right hand end of the housing; an operating member OM movable in the left hand end of the cavity and dividing the cavity on the left into a high pressure chamber and on the right into a control pressure chamber; a controlled component CC associated with operating member OM; a ported element PE extending from the right end of the operating member OM into the control pressure chamber; a control element CE biased to a neutral position by springs SP1, SP2 and moved against the bias of these springs by energization of either solenoid SO1 or SO2.

In addition the actuator shown, includes a dirt filter FI and a pressure limiting valve PV mounted in the housing HO and a flow regulating valve FR positioned in the operating member OM.

HOUSING

The housing is comprised generally of two members, an operating member housing HO1, and a control pressure chamber housing, HO2, threaded together and sealed by means of an O-ring 1011.

Housing HO1 is generally a rectangular block of metal having a cylindrical cavity 1009 therein defined by a cylindrical surface 1012 and a cylindrical opening in its left end defined by a cylindrical surface 1013, in which the controlled component CC is slideable and sealed by means of an O-ring 1014 and a dirt seal 1015 positioned in recesses in the surface 1013. The diameter of the cavity 1009, i.e., surface 1012, in relation to the diameter of surface 1013 is such that the cross-sectional area of cavity 1009 is approximately twice the cross-sectional area of the opening for reasons which will appear.

Intermediate the length of cavity 1009, surface 1013 has a groove 1014 formed therein. A transverse passage 1015 communicates the groove with the outside of the housing where it is threaded as at 1016 to receive a hydraulic fitting (not shown) to communicate this portion of the cavity 1009 with low pressure.

Figure 17:
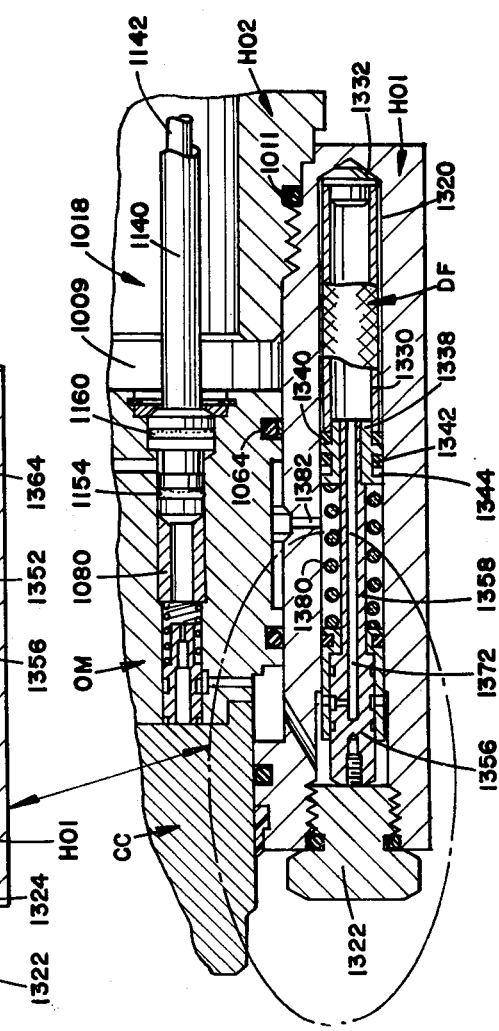
FIG. 17 is a fragmentary cross sectional view of FIG. 14 taken approximately on line 17—17 thereof.

High pressure as will appear is communicated to the left end of cavity 1009 by means of a passage 1017, shown in FIG. 17. The right end of cavity 1009 is threaded at 1010 to receive control pressure housing HO2 which includes a plurality of metallic members fastened in end to end relationship to form a cylindrical cavity 1018 and includes, reading from left to right: a machined member 1019 having on its left end a threaded boss 1020; a flange 1021 intermediate its ends and a first thin-walled sleeve 1022 on its right end. The housing HO2 additionally includes a second sleeve 1024, a third sleeve 1026, a fourth sleeve 1028 and a fifth sleeve 1030, the right hand end of which is externally threaded and a cap 1032 threaded thereover which holds a plug 1034 in the right hand end of the sleeve 1030 sealed by an O-ring 1036. The boss 1020 is threaded and fits snugly into the right hand end of cavity 1009 and includes a shoulder 1042 which abuts a corresponding shoulder on housing HO1 to accurately position the housings HO1 and HO2 and hold them and their cavities in exact axial alignment and spacing.

The main member 1019, (and sleeve 1022), the sleeves 1026 and 1030, and the cap 1032 are all of magnetically permeable material. Sleeves 1024, 1028 and plug 1034 are of magnetically non-permeable material.

Solenoid coils SO1, SO2 include generally a plurality of turns of electrically conductive material, indicated generally at 1052, 1053, wound onto bobbins of electrically insulating material 1050, 1051, all as is conventional. The bobbins 1050, 1051 are in axially spaced relationship and are slipped over and surround the sleeve members 1022 and 1030. A magnetically permeable washer 1044 is positioned between the solenoids SO1 and SO2 and is located generally midway of the sleeve 1026.

Flange 1021 along with washer 1044 and cap 1032 extend radially outwardly beyond the outer surfaces of the bobbins 1050, 1051. Solenoid housing 1056, 1058 of magnetically permeable material surround and enclose the solenoid windings SO1, SO2 respectively and overlap and abut with the outer surfaces of the flange 1021, washer 1044 and cap 1032 to complete the external magnetic circuit for the solenoids.

In the embodiment of the invention shown, sleeves 1024, 1028 are identical in construction and in accordance with the invention, the left hand end of sleeve 1024 and the right hand end of sleeve 1028 are rabbeted on the outside while the opposite ends are rabbeted on the inside. This enables these sleeves to be manufactured in a single operation on an automatic screw machine thus eliminating the secondary operation heretofore required by similar sleeves of the prior art wherein both ends were rabbeted either on the inside or outside.

The adjacent ends of sleeves 1022, 1026, 1030 are correspondingly rabbeted to mate with the rabbets of the sleeves 1024, 1028 and these sleeves are all brazed together and machined to provide a smooth continuous surface 1059 which defines the right hand end of the cavity 1018 which will hereinafter be referred to as the control pressure chamber. By rabbeting sleeves 1022 and 1030 on the inside an improved magnetic force displacement curve on control element CE is obtained. The lengths of the rabbets on sleeves 1022, 1030 is important as will appear hereinafter.

Sleeves 1024, 1028 provide a shaped magnetic air gap for the solenoid coils SO1, SO2 respectively.

OPERATING MEMBER

The operating member OM may take the form of any element which can move in the housing HO1 as the result of fluid pressures being exerted thereon. Such element may be a diaphragm, a bellows or the like, but in the preferred embodiment is a piston 1060 having left and right hand pressure seals 1062, 1064 positioned in grooves in the outer surface and slidable in sealed relationship with surface 1012 of the housing HO1. In addition piston 1060 has a central portion intermediate seals 1062, 1064 of reduced diameter defining a low pressure cavity 1066 in communication with groove 1014 which, as heretofore pointed out, communicates to low pressure through passage 1015.

Piston 1060 has a left-hand, high-pressure facing surface 1068 in the form of an annulus and a right-hand, control-pressure facing surface 1070 with the area of surface 1068 being approximately one half the area of the surface 1070 such that if the pressure on surface 1070 is one half the pressure on surface 1068, the operating member OM will be in axial pressure force balance. It is noted that the area of surface 1068 is equal to the area of surface 1070 minus the cross-sectional area of controlled component CC. Thus by varying the diameter of controlled component CC, the differential areas may be appropriately adjusted.

Pressure seals 1062,1064 may be of any known type, e.g., a close mechanical fit, conventional O-rings or preferably what is known in the art as "Glyd Rings", a ring of Teflon or Nylon-like material biased outwardly by a resilient rubber-like ring.

The right end of the operating member OM has an elongated cylindrical passage 1076 extending thereinto at the base of which is positioned the flow regulating valve FV. A first counterbore 1077 provides a right hand facing shoulder 1078 against which a spacer member 1080 in the form of a sleeve having a longitudinal passage 1082 abuts. A second counterbore 1083 provides a right hand facing radiused shoulder 1084 and a third counter bore 1085 provides a right hand facing shoulder 1086 all for reasons which will appear. Intermediate shoulders 1082,1084, a radial passage 1088 communicates the bore with the low pressure chamber 1066. A radial passage 1090 communicates from a point adjacent the base of bore 1076 with the external surface of the controlled component CC which in turn defines the high pressure cavity 1009 to the left of the piston 1060.

Operating member OM may be an integral machined member or made in two pieces brazed together as shown.

CONTROLLED COMPONENT

The controlled component CC may take a number of different forms, e.g., the stem of a valve, the spring of a pressure relief valve or as shown, a large diameter shaft integral with the operating member OM, and extending through the left end of the housing in sliding sealing relationship therewith as heretofor indicated. The controlled component CC in the embodiment shown has means 1074 on its left end for being mechanically connected to a device which the actuator is to control. Obviously the controlled component CC could be the valve member, the spool, or the spring of FIGS. 8, 6 or 7 respectively.

FLOW REGULATING VALVE

The flow regulating valve FR in the embodiment shown includes a valve piston 1110 slideable in sealed relationship with the walls of the bore 1076 and biased to the left by means of a spring 1128. The piston 1110 has a through axial passage 1112, the right hand end of which is of a restricted diameter to form an orifice 1114. Piston 1110 also has a groove 1116 in its outer surface so located so as to communicate with passage 1090 and communicated with the internal passage 1112 by cross-drilled openings 1118. Grove 1116 is so located that as the piston 1110 moves to the right against the bias of spring 1128 at one point in the movement, communication from passage 1090 to grove 1116 is cut off.

Valve member 1110 has a portion of reduced diameter to form a boss 1126 and a right hand facing shoulder 1127. Spring 1128 fits over the boss 1126 and at its left end bears against shoulder 1127 and at its right end against the left hand surface of spacer 1080. Boss 1126 has a diameter slightly greater than the diameter of the passage 82 whereby spacer 1080 forms a stop to limit the movement of valve piston 1110 to the right.

Orifice 1114 provides a restriction to the flow of fluid from passage 1112 to the right into the passage 1082 of spacer 1080 such that when fluid is flowing rapidly enough, the pressure on the left hand end of valve piston 1110 will be greater than the pressure on the right hand end resulting in the piston 1110 moving against the bias of spring 1128 and ultimately restricting the flow of fluid from passage 1090 into groove 1116.

By varying the diameter of orifice 1114, the maximum rate of flow of fluid through the valve FR can be readily adjusted at the time of manufacture.

PORTED ELEMENT

Ported element PE in the embodiment of the invention shown is comprised of an elongated outer tube 1140 and a shorter inner tube 1142 supported at its ends in sealed relationship with the inside of the tube 1140 by means of left and right end spacers 1144,1146 which spacers are brazed to the inside and outside of tubes 1140,1142 respectively to provide a low pressure passage 1141 in the space between the two tubes which passage is closed at both ends. Spacers 1144,1146 each have passages 1145,1147 therethrough communicating the left end of the ported element PE with the inside 1143 of tube 1142 and in turn the inside 1148 of tube 1140 to the right of tube 1142 and spacer 1146.

The left end of tube 1140 is formed to loosely fit in sealed relationship into the counterbores of operating member OM so as to be in a slightly pivoted, pressure balanced, relationship with the operating member OM and to communicate passage 1141 to low pressure.

To accomplish these functions the left hand surface 1150 of tube 1140 is generally in the shape of the segment of a sphere and is coated with an anti-friction material 152. Immediately to the right of this surface 1150, the outer surface has a groove in which a flexible sealing ring 1154 is positioned which sealing ring bears against the inner wall of the first counterbore 1077. Immediately to the right of the seal 1154, the tube 1140 has cross drilled passages 1156 communicating the passage 1141 with a radial passage 1086 in the operating member OM which passage as indicated communicates with the low pressure cavity 1066.

Immediately to the right of the passage 1156, tube 1140 has a flange of an outer diameter just less than the diameter of the third counterbore 1085 and a groove in its side in which a sealing ring 1160 similar to the sealing ring 1154 is positioned. By virtue of the clearance between the outer surfaces of the tube 1140 and the inner surfaces of the counterbores, of the operating member OM and by virtue of the flexibility of the rings 1154 and 1160, the ported element can have a slight pivoted movement relative to the operating member OM.

The right hand facing surface 1162 of the flange 1158 is an annulus generally in the shape of a segment of a sphere and is coated with anti-friction material 1164. In accordance with the invention the spherical surfaces 1150, 1162 have a common center of curvature 1166. In effect, the surfaces 1150 and 1162 are chordal segments or slices of the same sphere with the segment 1150 having a lesser outer diameter than segment 1162.

A washer 1170 is positioned in the right end of the operating member bore and abuts against shoulder 1098 and is held in position in the bore by means of a split ring 1173 fitted into a groove in the side of the bore. In accordance with the invention the inner left hand corner of the wahser 1170 is beveled to provide a surface 1172 generally in the shape of concave segment of a cone and this surface is coated with an anti-friction material 1174.

Spacer member 1080 has a right hand facing surface 1130 coated with an anti-friction material 1132 which surface is generally in the shape of a concave conical annulus.

Conical surface 1130 abuts against spherical surface 1150 and conical surface 1172 abuts spherical surface 1162 and in accordance with the invention, the angles of the two conical surfaces are such that the conical surfaces will be tangent with the respective spherical surfaces adjacent the outer periphery of such spherical surfaces.

It will be appreciated that the surfaces 1130 and 1172 could be spherical; however, it has been found that forming these surfaces 1130 and 1172 in the shape of a cone rather than in a sphere provides a higher unit pressure between the abutting surfaces which results in a lower coefficient of friction.

The anti-friction material employed on the various surfaces above referred to may be any known anti-friction material having adequate wear and abrasion resistant characteristics. Such material can be any of the known anti-friction materials such as Teflon or the like but in the preferred embodiment the material is Impreglon, manufactured by Impreglon Michigana Co. A coefficient of friction as low as 0.002 results.

It is believed this coating is placed on these surfaces by a spray and/or baking process which forms no part of the present invention.

High pressure on the left hand end of the ported element exerts a pressure force to the right. The space between the sealing rings 1154 and 1160 is at low pressure. The right hand facing surfaces of the ported element are at control chamber pressure which exerts a pressure force to the left.

By varying the relative diameters of the first and third counterbores 1079,1085 and thus the areas defined by sealing rings 1154, 1160 the pressure differentials at which the ported element will be in axial pressure force, balance may be controlled. In the embodiment described in FIG. 6, the diameters were so chosen that the ported element would be in pressure force balance when the pressure in the control pressure chamber was equal to one-half the difference between high and low pressure. Inasmuch as the operating member OM is normally subjected to an external force in addition to the pressure force on its left hand surface 1068, such that the control pressure chamber will normally always be more than one half the pressure and differential, it is preferred now that the ratio of the diameter of the left end of the stem 1140 to the diameter of the flange 1158 be such that the ported element PE be in axial pressure force balance when the control pressure chamber is equal to ¾ the difference between high pressure and low pressure. Different ratios may obviously be employed.

It is important that the control element CE move freely relative to the ported stem PS. Tube 1140 in the preferred embodiment is made from non-magnetic stainless steel. Such steel is difficult to grind to a smooth surface. In the grinding operation, the steel has a tendency to tear and it is difficult to obtain a finish below 40 RMS. In accordance with the invention the outer surface of tube 1140 has a flash coating of chromium which is ground to a 10 RMS surface finish.

PORTING OF PORTED ELEMENT

The space 1141 between the inside of tube 1140 and the outside of tube 1142 is communicated to the outside of tube 1140 through a plurality of cross drilled openings 1180 just to the left of the spacer 1146.

The right hand end of tube 1140 is closed by a plug 1182 brazed thereinto and just to the left of plug 1182 the inside of tube 1140 is communicated to the outside through a plurality of cross drilled passages 1184. In the embodiment shown there are four passages 1180 and four passages 1184. The remote surfaces of these passages are spaced a distance apart indicated by the dimension L.

Tube 1140 has a plurality of pressure balancing grooves in its outer surface. A first groove 1190 intersects passages 1180 on the side toward passages 1184 and in a like manner a groove 1192 intersects the passages 1184 on the side toward passages 1180 which sides may be referred to as the inner sides. In addition there is a wide central groove 1194 midway between the grooves 1190,1192 and midway between the wide groove 1194 and the grooves 1190 are a plurality of additional grooves 1196. In a like manner between the right hand end of the wide groove 1194 and the groove 1192 there are a plurality of additional grooves 1198.

CONTROL ELEMENT

The control element CE is a sleeve of magnetically permeable material having an inner surface 1200 of a diameter to closely fit with the outer surface 1188 of tube 1140 in sliding sealing relationship therewith and of a length M such that its left and right ends 1204,1206 overlap the side 1788 of the tube 1140 beyond the passages 1180,1184 a predetermined amount when the control element is symmetrically positioned relative to these passages. Control element CE thus restricts the flow of fluid through these passages. There is always some flow at high pressure differentials through the slight clearances which must necessarily exist to permit sliding movement of control element CE. The amount of flow is a function of the pressure differential, the clearance and the overlap. When control element CE moves, one set of passages is opened and the other set is more restricted.

The outer diameter of the control element CE tapers slightly from its center toward the ends such that the control element CE may rock slightly within the passage defined by the sleeves 1022, 1024, 1026, 1028 and 1030. It is possible to machine the slight taper but such machining is difficult. In accordance with the preferred embodiment, the center of control element CE has a narrow band 1210 of a diameter to freely slide within the inner surfaces 1059 of the control pressure chamber and portions 1212,1214 on each end of a lesser diameter of between 0.001 to 0.003 inches (preferably the former).

The outer surface of control element CE is coated with an anti-friction material 1226, e.g., Impreglon. Inner surface 1059 may also be coated with an anti-friction material. Control element CE has one or a plurality of longitudinally extending through passages which in the embodiment of the invention shown are a plurality of longitudinally extending grooves 1230 in the outer surface which permit the flow of fluid longitudinally of control element CE.

To prevent a build-up of the Impreglon material on the corners formed by the outer cylindrical surface of the control element CE and the sidewalls of the grooves 1230, these corners are coined at the time of manufacture to provide a slight flat 1240. Alternatively this corner can be machined or molded to a small radius.

SPRINGS

The control element CE is biased to a neutral position in housing HO1 and relative to the solenoids SO1 and SO2 by springs SP1 and SP2. In the embodiment of the invention shown, spring SP1 bears at its left end against a washer 1245 positioned in the passage of member 1022 by a split ring 1248 positioned in a groove in the inner wall of the passage. The right hand end of spring SP1 extends into and bears against a flange 1260 of a thimble 1262. Thimble 1262 has a radially outer flange 1264 on its left hand end which engages a left hand facing shoulder 1265 on the inside of sleeve 1022. This spring SP1 biases the thimble 1262 toward the right to a position determined by the shoulder 1265.

In a like manner, the right hand end of spring SP2 bears against plus 1034 and its right hand end extends into a thimble 1266 and bears against a radially inward extending flange 1268 to bias the thimble 1266 to the left to a position determined by the engagement of a radially outwardly extending flange 1268 against a right hand facing shoulder 1269 on the inside of sleeve 1030.

The spacing of the shoulders 1265,1269 and the dimensions of the thimbles are such that the control element will be biased to a neutral position symmetrical to the washer 1044 and to the solenoid coils SO1,SO2.

When coil SO1 is electrically energized, magnetic flux from the right hand end of sleeve 1023 draws control element to the left against the bias of the spring SP1.

When coil SO1 is de-energized spring SP1 returns the control element to its neutral position shown.

In a like manner when solenoid SO2 is energized, the magnetic flux will pull the control element to the right against the bias of spring SP2. The left hand axial end of control element CE is positioned generally midway of the magnetically non-permeable sleeve 1024, that is to say the magnetic air gap. For a fixed energization of either solenoid (i.e., a constant number of ampere turns), as the control element CE moves to the left under the magnetic force, two things happen; the amount of force required to compress the spring SP1 increases at a rate which is generally linear and determined by the spring characteristics. At the same time the magnetic force increases as the space between the right hand end of sleeve 1023 and the left hand end of control element CE decreases. If the left hand end of control element CE were square, rather than tapered as shown, this magnetic force would increase at an increasing rate until it exceeded the spring force rate at which time the control element would snap to its far left hand position. By tapering the left hand end of the control element CE, and by rabbeting the ends of the sleeves 1023,1030 on the inside as shown, the increase in the rate of increase is held down so that the rate of increase never exceeds the spring rate of increase. By properly selecting the angle and length of taper and the length of the rabbet in relation to the maximum movement of the control element CE, the magnetic force displacement curve can be made generally proportional to the energizing current for the solenoid SO1 and to intersect the spring force displacement curve at a sharply defined point.

In the preferred embodiment the control element CE has a diameter of 9/16 inches and the taper of surface 1220 is 15°. The length of the rabbet in sleeves 1023,1030 is between 0.080 to 0.180 inches.

POWER SUPPLY TO SOLENOIDS

Figure 18:
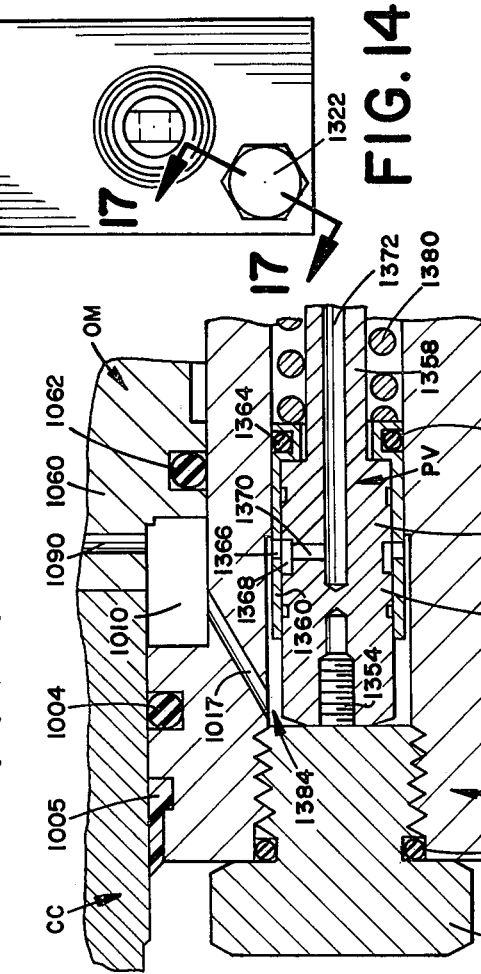
FIG. 18 is an enlarged fragmentary view of the encircled portion of FIG. 17.

The solenoids may be energized by either AC or preferably DC voltage and to overcome the effects of stiction, a dither voltage is applied to the energizing voltage for each coil. FIG. 18 shows the arrangement for supplying the dither voltage to the coils in accordance with the present invention. Thus, curve 1300 of FIG. 18 shows the variation in voltage supplied to the left hand solenoid SO1 while curve 1302 shows the voltage applied to the right hand solenoid SO2, it being noted that in the neutral position each coil is energized with approximately 3 volts so connected that the magnetic polarity at the adjacent ends of the coils is the same. Dither signals consisting of preferably a square wave 1304, 1306 each having a peak value of just less than 2 volts are continuously superimposed on the voltages supplied to the left and right hand coils SO1, SO2. These signals are of the same frequency. In accordance with the invention, the dither signals supplied to one coil are out of phase with the dither signal supplied to the other coil. Inasmuch as the dither signals each produce a magnetic force in an opposite direction, one does not oppose the force created by the other. FIG. 18 illustrates the phase relationship. Experiments over a considerably period of time using dither signals in phase produced inferior results at low energization levels of the solenoids.

I believe I am the first to ever have provided dual coil actuators with separate dither signals to each coil so phased that they do not create opposing magnetic forces.

DIRT FILTER AND PRESSURE LIMITING VALVE

Figure 16:
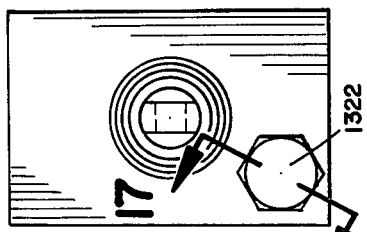
FIG. 16 is a cross sectional view of FIG. 10 taken approximately on line 16—16 thereof.
Figure 19:
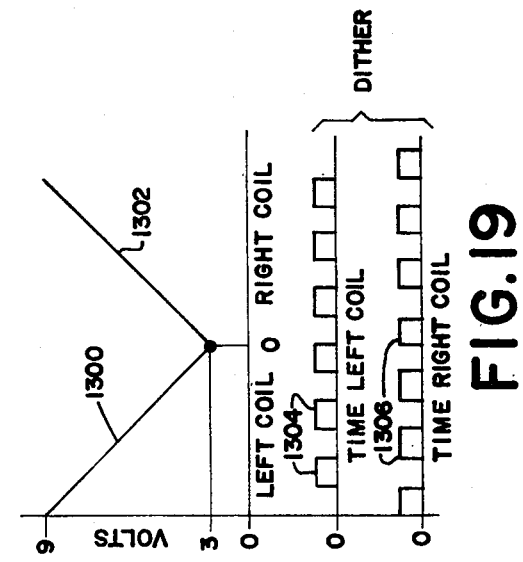
FIG. 19 is curves of voltages applied to the coils of FIGS. 5, 6 and 10.

In accordance with the invention, high pressure fluid is supplied to the high pressure chamber 1010 through the dirt filter DF and the pressure limiting valve PV which filter and valve are mounted in a bore 1320 extending into housing HO1 from the left hand end and closed by a threaded plug 1322 sealed by an O-ring 1324. As shown in FIG. 16 a transverse passage 1326 suitably threaded to receive a hydraulic fitting as at 1328 communicates with the bore adjacent to but spaced from its base. A cylindrical filter element 1330 of a diameter slightly less than the diameter of the bore has its right hand end bearing against a seal ring 1332, at the base of the bore. Support sleeve 1336 has a cylindrical boss 1338 extending into the left hand end of the filter sleeve 1330 to support same. An O-ring seal 1340 is positioned between the left hand end of the filter sleeve 1330 and a right hand facing shoulder on the sleeve 1336. The support sleeve 1336 also has a groove in its outer surface in which a pressure sealing ring 1342 and a pressure ring 1344 are mounted.

PRESSURE REDUCING VALVE

The pressure reducing valve PV is comprised generally of a differential area sleeve piston 1350 and a support rod 1352. In the embodiment shown, the support rod 1352 extends from the right hand face of plug 1322, to which it is fastened by means of a screw 1354, to support sleeve 1336 into which it extends and is fastened either by brazing or an adhesive. Support rod 1352 reading from left to right includes: a first portion 1356 of a diameter less than the diameter of bore 1320; and a second portion 1358 of a still lesser diameter. Sleeve piston 1350 includes a thin-walled portion 1360 slideable in the space between portion 1356 and the wall of the bore 1320 and a thicker-walled portion 1362 slideable in the space between portion 1358 and the walls of the bore 1320. A sealing ring 1364 is provided in the outer surface of the thicker portion 1362 in engagement with the surface of bore 1320.

The thinner portion 1360 of the valve piston 1350 has a pair of cross drilled ports 1366 which communicate with a groove 1368 in the surface of the portion 1356 which groove in turn communicates through a radial passage 1370 with an axial passage 1372 extending to the right and opening into the inside of filter element 1330.

A helical spring 1380 bearing at its right end against support member 1336 and at its left end against the right hand facing surface of sleeve piston 1350 biases the sleeve piston 1350 to the left. The space occupied by this spring is communicated to the low pressure cavity 1061 by means of a drilled passage 1382 plugged at the outer end.

As heretofore noted, passage 17 communicates the space between plug 1322 and the left end of the valve piston 1350 with high pressure cavity 10.

In operation fluid under pressure flows: through passage 1326 into bore 1320; through the filter element 1330; longitudinally through passage 1372; radially outwardly through passage 1370 into groove 1368, and then through passage 1366 into the space 1384 to the left of valve piston 1350. When the pressure on the left end of valve piston 1350 creates a force greater than the bias force of spring 1380, the valve piston 1350 moves to the right restricting communication of ports 1360 with the groove 1368 and preventing further increases of pressure in the chamber 1384.

OPERATION OF ACTUATOR

In operation high pressure in cavity 1010 flows through passage 1122 through the flow regulating valve FR and then axially through ported element PS to radial ports 1184. The right hand axial end of control element CE restricts the flow of fluid through port 1184. Any fluid flowing through port 1184 flows into the control pressure chamber (building up pressure there) and then outwardly through port 1180 into the passage between tubes 1140 and 1142, then radially outwardly through passage 1156, passage 1158 to the low pressure passage 1015. Because of the restrictive action of the ports 1180,1184, the pressure in the central pressure chamber absent any other restrictions will be approximately one half the difference between high and low pressure.

High pressure in the chamber 1010 exerts a force to the right on the operating member OM proportional to the area of surface 1068. Control pressure in the control pressure chamber exerts a force to the left on the operating member OM proportional to the area of the surface 1066. Inasmuch as the surface 1066 is twice the area of surface 1068, if the pressure in the control pressure chamber is not exactly one half the high pressure in chamber 1010, the operating member OM will move to the right or left depending on whether the pressure in the control pressure chamber is less than one half of more than one half the pressure in chamber 1010. The control element CE is of a length to restrict both ports 1180,1184 if symmetrically positioned relative thereto.

If the control element CE restricts ports 1180 and 1184 in exactly the same amount, the pressure in the control pressure chamber will equal one half of the pressure in chamber 1010.

If one of the solenoids is energized, for example solenoid SO1, the control element CE will move to the left, further restricting port 1180 but opening port 1184. This allows a greater amount of fluid wanting to flow into the control pressure chamber than wants to flow out and the pressure in the control pressure chamber increases. This increase causes the operating member OM to move itself and the ported element PS to the left and it will do so until the pressure relationships above described are reestablished.

In effect, the position of the control element CE is a slave to the energizing current in either of the solenoids and the operating member OM is a slave to the position of the control element CE.

ALTERNATIVE CONTROL ELEMENT

Figure 20:
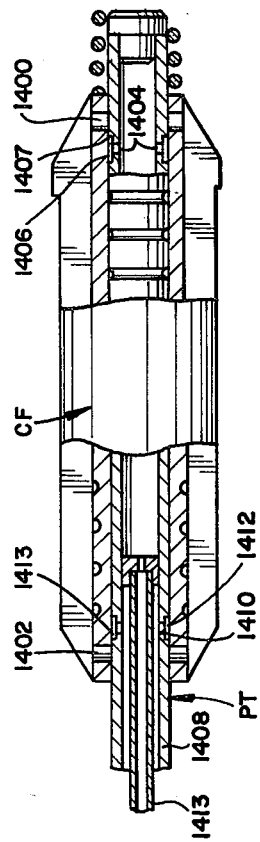
FIG. 20 is a view similar to FIG. 13, but showing an alternative ported stem and control element construction.

FIG. 20 shows an alternative arrangement of control element relative to the ported stem. In this embodiment instead of using the axial ends of the control element to restrict the ports 1180,1184, the control element CF is provided with a pair of radially extending ports 1140 spaced from but adjacent to the right hand end and a pair of radially extending ports 1402 spaced from but adjacent to the left hand end which ports are diametrically opposite.

The ported element PT is provided with: a pair of radially extending ports 1404 communicating with a circumferential groove 1406 adjacent the right hand end of the ported element and communicating with the inside of tube 1408; and, a pair of radially extending ports 1410 communicating with a circumferential groove 1412 in the outer surface of tube 1408 and communicating the groove 1412 with the coaxial space between tubes 1408 and 1413.

In this embodiment of the invention, the axially adjacent surfaces of the ports 1400,1402 are spaced apart a distant L greater than spacing M between the remote edges 1407 and 1413 of grooves 1406 and 1412 respectively. This construction in some ways is preferred because in manufacturing it is quite easy to insure that the surfaces 1407 and 1413 will be exactly perpendicular to the axis of the ported element and the exact spacing of the passages 1400,1402 is easily controlled. By exactly controlling the axial spacing of surfaces 1407 and 1413 relative to the axial spacing of the ports 1400 and 1402, the leakage of high pressure fluid through the ports may readily be controlled to an exact desired amount necessary to give the desired accuracy of control of the position of the operating member OM relative to the position of the control element CF.

MODIFIED FLOW CONTROL VALVE

Figure 21:
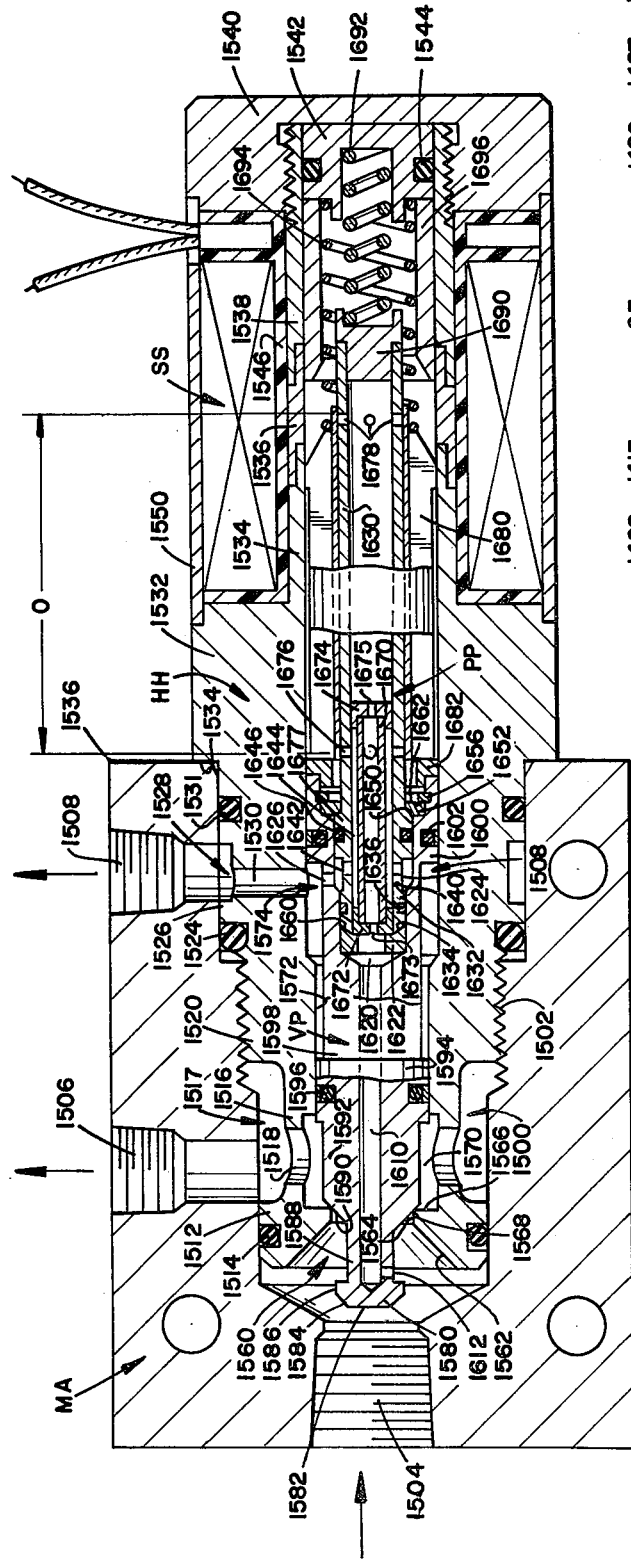
FIG. 21 is a cross sectional view of a flow control valve similar to FIG. 9 but showing the low pressure passage from the control pressure communicating directly to the sump or zero pressure.

Referring now to FIG. 21, there is shown a needle or flow control valve assembled with a manifold MA, and comprised generally of: a housing HH; a valve piston VP; a ported element PQ; a control element CC, and a solenoid coil ST surrounding the right hand end of the housing HH.

The manifold MA is generally standard in construction and is shown only for the purposes of illustrating the environment of the valve and includes generally a bore 1500 threaded intermediate its length at 1502 and having; at the base thereof a high pressure inlet port 1504; to the left of the threaded portion 1502 an outlet port 1506; and, to the right of the threaded portion 1502 a threaded outlet port 1508 normally communicated to the tank and at zero pressure.

The housing HH includes generally an elongated cylindrical member having an axially extending cylindrical cavity in which valve piston VP is slideably supported and reading from left to right: a first portion 1512 having a sealing ring 1514 in the outer surface; a second portion 1516 of reduced diameter to provide an outlet pressure chamber 1518 communicated with the left end of the housing bore by ports 1518 and with the outlet port 1506; a threaded portion 1520 having threads in engagement with threads 1502 of the manifold MA; a groove just to the right of the threads to receive a sealing ring 1524; a larger portion 1526 having a groove 1528 therein in communication with the tank outlet passage 1508; a radial passage 1530 extending into communication with the bore of the housing HH; groove in which a sealing ring 1530 is positioned; and, a main portion 1532 forming a left hand facing shoulder 1534 which abuts against the right hand facing surface 1536 of the manifold MA when assembled therewith.

Extending from the right end of main portion 1532 is: an integral sleeve portion 1534; a second sleeve member 1536; and, a third sleeve member 1538 which is externally threaded to receive an end cap 1540. The end cap 1540 holds a sealing plug 1542 in the right end of sleeve 1538 which plug has a sealing ring 1544 in its outer surface.

The solenoid coil ST includes a conventional coil winding on a bobbin 1546 surrounding the sleeves 1534,1536, 1538. The main portion 1532 and the end cap 1540 have a diameter greater than the diameter of the bobbin 1546 and a solenoid housing 1550 fits into rabbets in the portion 1532 and the cap 1540 to complete the external magnetic circuit for the solenoid circuit ST. Thus importantly the main portion 1532, its sleeve portion 1534, the sleeve 1538, the cap 1540, and the solenoid housing 1550 are formed of magnetically permeable material. The sleeve 1536 is formed of magnetically non-permeable material to provide a magnetic air gap for the solenoid ST.

As seen from the drawings, the left hand end of sleeve 1538 is rabbeted on the inside while the right hand end of sleeve 1534 is rabbeted on the outside. Sleeve 1536 is rabbeted to mate with these rabbets and these sleeves 1534, 1536, 1538 are brazed together.

The bore of the housing HH has inlet port 1560 defined by an outwardly divergent or conical surface 1562, and a generally cylindrical surface 1564 which intersects with the right hand facing surface 1566 of bore 1500 to form a sharp edged valve seat 1568. Immediately to the right of surface 1566, the bore has a groove 1570 in communication with the outlet ports 1518 and to the right thereof a cylindrical surface 1572 and a counter bore defined by a cylindrical surface 1574 which continues to the far right end of the housing cavity.

The valve piston VP is a single member machined to have, reading from left to right: a nose 1580 having a central left hand facing flat surface 1582; a bevelled outer corner 1584; a cylindrical outer surface 1586; a portion of reduced diameter 1588; an outwardly divergent conical surface 1590 which forms a valve seat engaging surface; a cylindrical portion 1592, and enlarged portion 1594 having a sealing ring 1596 in a groove in the outer surface; a portion of reduced diameter 1598; and, a further portion of a larger diameter 1600 having a sealing ring 1602 positioned in a groove in its outer surface.

The valve piston VP also has a bore 1610 extending from its right hand end to a point adjacent the nose 1580 and a single radial port 1612 communicating the base of passage 1610 with the high pressure inlet port 1504. The inlet to the passage 1612 is at right angles to the axis of the inlet passage 1504 and is shielded from a direct line of communication with the inlet passage 1504 by the nose 1580 and its bevelled surface 1584 which causes any fluid entering port 1612 to first be deflected outwardly then make at least a 180° turn. The inertia of dirt particles entrained in the fluid will prevent them from entering the port.

The bore 1610 at its right hand end has: a first counterbore 1620 in which a spacer member 1622 is based; a second bounterbore 1624 communicated with the outside of the piston VP by a radial passage 1626 and through passage 1530 to tank passage 1508.

The ported stem PP includes an outer tube 1630 which reading from left to right has: a first portion 1632 having a left hand facing spherical surface 1634 and a sealing ring 1636 in its outer surface in sealing engagement with the surface of the counterbore 1620; a second portion 1640 of reduced diameter having a radial passage 1642 therethrough; a third portion 1644 of a diameter greater than the diameter of the portion 1632 having a sealing ring 1646 in the outer surface in sealing engagement with the walls of the counterbore 1624; and, a right hand facing spherical surface 1650 which surface has the same center of curvature as the surface 1634.

A washer 1652 is held in a further counterbore in the valve piston VP by means of a split lock ring 1656.

A right hand facing surface 1660 of spacer 1622 and a left hand facing 1662 of washer 1652 are conical surfaces of such an angle and diameter as to tangentially engage the radially outermost portions of the spherical surfaces 1634, 1650. These surfaces are coated with an anti-friction material such as Teflon or Impreglon.

Inside of the left end of tube 1630 is a second, shorter tube of lesser diameter 1670 with its left and right ends supported in sealed relationship with the inside of the tube 1630 by spacer members 1672, 1674 respectively, which spacer members have axial passages 1673,1675 respectively.

Intermediate spacers 1672 and 1674, outer tube 1630 has four radial ports 1676 which communicate the space 1677 between inner tube 1670 and outer tube 1630 with the portion of the cavity to the right of piston VP.

In like manner the outer tube 1630 has four radial passages 1678 to the right of spacer 1674 communicating the inside of tube 1630 with the chamber to the right of the piston VP with the axial spacing between the axially remote surfaces of the ports 1676,1678 being spaced a distance O.

Control element CC is in the form of a sleeve having a pair of longitudinally extending grooves 1680 in the outer surface and an inner surface and in sliding close fitting engagement with the outer surface of tube 1630. The axial length of the control element CC is just slightly greater than the spacing O such that when the control element CC is symmetrically positioned relative to the ports 1676,1678, it will partially restrict the flow of fluid through these ports.

The control element CC is formed of magnetically permeable material and as described hereinbefore has a coating of magnetically non-permeable material of a thickness of approximately 0.001 inch.

A spacer member 1682 engages the right hand end of piston VP and the left hand end of control element CC to position the axial ends of the control element CC symmetrically relative to the ports 1676,1678 when solenoid ST is unenergized.

The right end of control element CC has a taper of approximately 30 degrees and the extreme right end is positioned generally midway of the length of the magnetically non-permeable sleeve 1536.

The right hand end of tube 1630 is closed by means of a plug 1690 brazed in place. A spring 1692 based at its right end against plug 1542 and its left end against plug 1690 biases the ported element PP and the valve piston VP to the left and the valve seat engaging surface 1590 into light pressure engagement with valve seat 1568. A second spring 1694 co-axial with spring 1694 based at its right end on plug 1542 and at its left end against control element CC biases control element CC against the spacer member 1644. A sleeve 1696 of non-magnetic material surrounds spring 1694 and provides a stop to limit the movement of control element CC and thus piston VP to the right.

In operation high pressure is communicated from the inlet port 1504 through port 1612, bore 1610, pasage 1673, the inside of tube 1670, passage 1675, the inside of tube 1630 and ports 1678 into the control pressure chamber, ports 1678 being partially restricted by the right hand end of control element CC.

Ports 1676 communicate with zero pressure through the space between tubes 1670 and 1630, ports 1642, port 1626, passage 1530 and passage 1508, it being noted that port 1676 is partially restricted by the left hand end of control element CC.

The diameter of valve seat 1568 is such that the area defined by the valve seat is one-half the total right hand facing area of the valve piston VP such that if pressure in the control pressure chamber is one-half the inlet pressure in passage 1504, the valve seat engaging surface 1590 will be in sealing engagement with the valve seat 1568 under the force of bias spring 1692. If control element CC is moved to the right a short distance by energization of the solenoid ST, port 1678 will be more restricted and port 1676 will be less restricted resulting in a reduction in pressure in the control pressure chamber. Pressure on the valve piston inside of the valve seat engaging surface 1590 will force the valve seat engaging surface 1590 away from the valve seat 1568 this same distance, allowing fluid to flow from inlet port 1504 to outlet port 1506 through passages 1518. Some of the fluid first impinges on the left hand end of nose 1580 resulting in the flow of fluid being deflected radially outwardly against surface 1562 then inwardly to flow past the valve seat 1568. Any dirt entrained in the fluid flowing will also be deflected outwardly. Port 1612 is shielded from this flow of fluid and any entrained dirt will not flow thereinto due to the velocity and the weight of the particle.

The invention has been described in detail in connection with preferred embodiments. Obviously modifications and alterations will occur to others upon a reading and understanding of this specification and it is my intention to include all such modifications and alterations insofar as they come within the scope of the appended claims.

Having thus described my invention, I claim:

1. A magnetically controlled fluid pressure device comprised of:
   (a) a housing having an elongated cylindrical cavity;
   (b) an operating member axially movable in said cavity with one axial end defining with said cavity a closed control pressure chamber;
   (c) a controlled component operatively associated with said operating member;
   (d) a high pressure passage and a separate low pressure passage, one communicating high pressure and the other low pressure, respectively, with said chamber, at least one of said passages moving with said member and radially opening outwardly into said chamber;
   (e) means restricting the flow of fluid through each of said passages, including a magnetically permeable control element movable within said control pressure chamber and operable when moved relative to said one passage to restrict or open same relative to the other passage; and
   (f) controllable magnetic means operable to position said element to desired positions within said chamber.

2. The device of claim 1 including means for exerting a force on said operating member opposite to the force of pressures in the control chamber pressure.

3. The device of claim 2 wherein said force exerting means include an opposite end on said operating member of lesser area than said control pressure end and defining with said cavity a high pressure chamber.

4. The device of claim 3 wherein the area of said opposite end is one half the area of the end of said operating member exposed to the pressure in said control pressure chamber.

5. The device of claim 4 wherein said controlled component is a shaft extending externally of said housing.

6. The device of claim 3 wherein said operating member includes an element extending into said control pressure chamber and said at least one of said passages extends from adjacent an end of said element through said operating member.

7. The device of claim 3 wherein said operating member includes an element extending into said control pressure chamber and said inlet and outlet passages extend from adjacent an end of said element at least through said operating member, to communicate said inlet passage with said high pressure chamber and said outlet passage with low pressure.

8. The device of claim 1 wherein said controlled component is a shaft extending externally of said housing.

9. The device of claim 1 wherein said operating member includes an element extending into said control pressure chamber, and said control element is a sleeve closely surrounding said element and movable relative thereto.

10. The device of claim 9 wherein said element is a separate member attached to said operating member in such a way as to be slightly movable radially in relation to said operating member.

11. The device of claim 10 wherein the radial movement is accomplished by using pliant sealing means.

12. The device of claim 11 wherein said pliant sealing means are O-rings.

13. The device of claim 1 wherein said operating member includes a ported element extending into said control pressure chamber and said control element surrounds said ported element and is slidably supported in said chamber.

14. The device of claim 1 wherein said operating member includes a ported element extending into said control pressure chamber, and said control element is slidably supported on said ported element.

15. The device of claim 1 wherein said operating member includes a ported element extending into said control pressure chamber, and said control element surrounds said ported element and is movable relative to said one passage to open or close the communication of same to said chamber.

16. The device of claim 1 wherein said operating member includes an element extending into said control pressure chamber and said control element surrounds said element and is movable relative thereto to simultaneously open one and close the other passage.

17. The device of claim 1 wherein said lower pressure passage is restricted relative to said high pressure passage and said control element opens and closes said high pressure passage.

18. The device of claim 17 wherein said operating member is a piston and said low pressure passage is in the form of a plurality of square-edged orifices.

19. The device of claim 18 wherein said square-edged orifices are formed by a plurality of circumferentially extending grooves intersected by a longitudinally extending groove in the cylindrical surface of said piston, said piston being movable of sliding sealing engagement with surfaces in said operating member cavity.

20. The device of claim 17 wherein said low pressure passage includes a longitudinally extending passage in said piston having an orifice of smaller diameter.

21. The device of claim 1 wherein said operating member includes a cylindrical element extending into said control pressure chamber and having a cylindrical groove communicating with said one of said passages.

22. The device of claim 1 wherein said operating member includes a cylindrical element extending into said control chamber and, said control element is in the form of a sleeve having an end adapted to overlap said one of said passages.

23. The device of claim 1 wherein said operating member includes a cylindrical member extending into said control pressure chamber, said high and low pressure passages include axially spaced ports in the side of said element, said control element is in the form of a sleeve having an inner surface at least in close spaced relationship with the surface of said cylindrical member, the length of said sleeve being such as to overlap both said ports a predetermined amount.

24. The device of claim 23 wherein a circumferentially extending groove each of said ports and the ends of said control element groove are spaced a distance apart approximately equal in distance to the spacing of remote side walls of said ports.

25. The device of claim 1 wherein said operating member includes an element extending from one end into said control pressure chamber, an opposite end exposed to high pressure and an intermediate portion exposed to low pressure, the area of said opposite end being less than the area said one end.

26. The device of claim 25 wherein said low pressure passage extends from adjacent one end of said element through and to the low pressure surface of said operating member and means communicate said passage with low pressure.

27. The device of claim 1 wherein said controllable magnetic means includes a solenoid surrounding said control pressure chamber.

28. The device of claim 1 wherein spring means bias said control element to a predetermined position in said chamber.

29. The device of claim 28 wherein said controllable magnetic means include a solenoid coil surrounding said control chamber.

30. The device of claim 29 wherein said controllable magnetic means include means for energizing said solenoid coil from a minimum current to create a force on said control element approximately equal to the initial bias force of said spring means to a maximum where said spring means are further stressed.

31. The device of claim 1 wherein said operating member includes a ported element extending into said control chamber, and said control element surrounds said ported element, means including a spring at each end of said control element biasing said control element to a mid position in said chamber.

32. The device of claim 31 including stop means spaced a distance apart slightly greater than the length of said control element, said bias means engaging said stops to space same from the end of said control element.

33. The device of claim 1 wherein said controllable magnetic means include a pair of axially aligned solenoid coils surrounding said control pressure chamber, said coils being symmetrically positioned relative to the mid position of said control element.

34. The device of claim 33 including:
(a) means for selectively energizing either of said solenoid coils with a variable D.C. voltage; and,
(b) means for simultaneously energizing each of said coils with a pulsating D.C. dither voltage, the pulses to one coil being out of phase with the pulses to the other coil.

35. The device of claim 1 wherein said control element has a narrow band of a diameter to fit closely against the walls of said cavity and has a slight taper toward one end.

36. The device of claim 1 wherein said control element is in the form of a sleeve of magnetically permeable material having an outer coating of magnetically nonpermeable material.

37. The device of claim 36 wherein said magnetically non-permeable material is a plastic.

38. The device of claim 36 wherein said control element slidably engages the walls of said control chamber and has a predetermined clearance therewith and said magnetically non-permeable coating has a thickness at least twice said predetermined clearance.

39. The device of claim 1 wherein said high pressure passage communicates with said cavity through radial passages.

40. The device of claim 1 wherein said operating member includes: a ported element extending into said control pressure chamber; an end surface on said operating member with said cavity a high pressure chamber; said high pressure passage extends from adjacent an end of said ported element through said operating member; and, means communicate the end of said passage opposite from the end of said element with said high pressure chamber.

41. A fluid pressure actuator comprising in combination: a housing having a generally closed elongated cylindrical chamber therein, one end of said chamber having a diameter less than the diameter of an adjacent portion, a differential area piston having a high pressure portion slidable in said smaller diameter chamber and forming a high pressure chamber and a larger diameter portion slidable in the larger diameter portion of said chamber dividing said larger diameter portion chamber into a low pressure chamber adjacent said high pressure piston and a control pressure chamber on the side of said differential area piston remote from said smaller diameter chamber; a shaft extending from said high pressure portion externally of said housing, a ported element extending from said low pressure portion into said control pressure chamber; an inlet passage communicating said high pressure chamber with a side surface of said ported element; an outlet passage communicating said control pressure chamber to low pressure; a control element movable in said chamber and surrounding said ported element and moving relative to said ported element to restrict the communicating of one of said passages to said chamber relative to the other; said control element being at least in part of magnetically permeable material; and a solenoid coil surrounding said control pressure chamber and operable when energized to move said control element to fixed positions in said chamber.

42. The actuator of claim 41 wherein said inlet passage opens to a circumferential groove on the surface of said ported element and said control element is movable relative to said groove to open and close its communication to said pressure chamber.

43. The actuator of claim 41 wherein said control element has a circumferential groove in its inner surface and passage means communicating said groove with said control pressure chamber.

44. The actuator of claim 41 wherein said ported element has a pair of axially spaced circumferential grooves and an intermediate land in its side surface, an inlet passage in said piston and ported element communicates high pressure to one of said grooves and a second passage in said piston and element communicates low pressure to the other of said grooves, said control element having a groove in its inner surface having an axial length approximately equal to the axial length of the land between said two grooves and magnetic means for moving said control element in said chamber.

45. The actuator of claim 41 including a pair of solenoid coils in axially spaced arrangement, means biasing said control element so as to be axially centered relative to said solenoid coils and means for energizing said solenoid coils including:
(a) means for selectively energizing either of said solenoid coils with a variable D.C. voltage; and,
(b) means for simultaneously energizing each of said coils with a pulsating D.C. dither voltage, the pulses to one coil being out of phase with the pulses to the other coil.

46. The actuator of claim 41 wherein a solenoid coil is provided surrounding said pressure chamber adjacent said control element and means are provided for selectively energizing said coil, such means including a potentiometer operable to energize said solenoid from a maximum to a minimum and means limiting the minimum energizing current wereby said control element has a magnetic force thereon approximately equal to the bias of a spring biasing said control member to a predetermined position.

47. A linear servo motor comprised of:
a controlled pressure chamber and a contiguous operating chamber;
passages to and from said controlled pressure chamber communicating both high and low pressures thereto;
an operating piston slidable in said operating chamber;
a rod movable with said operating piston and extending into said controlled pressure chamber and having at least one port in its side communicating one of said passages to said controlled pressure chamber;
means biasing said piston toward said controlled pressure chamber;
a control element in said controlled pressure chamber in the form of a sleeve surrounding said rod and operable when moved relative to said rod to open or restrict at least said one port relative to the other passage and vary the pressure in said controlled pressure chamber whereby the operating piston position is determined by the position of said control element in said controlled pressure chamber.

48. The device in claim 47 wherein said control element is made of a magnetically permeable material and its position in said control chamber is determined by an adjacent controllable magnetic field.

49. The device in claim 48 wherein said adjacent controllable magnetic field is generated by a solenoid means radially surrounding said control chamber.

50. The device in claim 49 wherein said solenoid means consist of a single coil wherein north-south relationship is unimportant to position said control element.

51. The device in claim 49 wherein said solenoid means consists of two adjacent coils having an adjacent common pole separated by a magnetically permeable member.

52. The device of claim 47 wherein the rod movable with said operating piston is a separate member attached to said operating piston in such a way as to be slightly movable radially in relation to said operating piston.

53. The device of claim 52 wherein the radial movement is accomplished by using pliant sealing means.

54. The device of claim 53 wherein said pliant sealing means are O-rings.

55. The device of claim 52 wherein the rod includes a first portion of a first cross sectional area and a second portion axially spaced therefrom of a second larger cross sectional area in first and second bores in said operating member, pliant sealing means between each of said portions and their respective bores, said first portion being exposed to high pressure and said second portion and rod being exposed to control chamber pressure, the space between said sealing means being communicated to low pressure.

56. In a fluid pressure energized electrically controlled actuator comprising in combination:
 a. a housing having an elongated cylindrical cavity,
 b. a piston slidable in said cavity having a first end surface defining with said cavity a high pressure chamber and a second end surface defining with the other end of said cavity a control pressure chamber,
 c. a cylindrical stem extending from said second end surface into said control pressure chamber; and,
 d. a radially opening port in said stem,
 e.
a flow regulating valve in said piston having its input communicating with the high pressure chamber and its output communicating with said port.

57. In a fluid pressure energized electrically controlled actuator comprised of in combination:
 a. a housing having a cylindrical cavity therein;
 b. a piston having a first end surface defining with one end of said cavity, a high pressure chamber and a second end surface defining with the other end of said cavity a control pressure chamber;
 c. means in said housing communicating a central portion of said piston to low pressure;
 d. a cylindrical stem extending from the second end surface of said piston into said control chamber;
 e. an outlet port in said stem and means communicating same with an intermediate portion of said piston and said low pressure;
 f. a high pressure inlet port in said stem and a passage communicating same through said piston to said high pressure chamber;
 g. a flow regulating valve in said passage for restricting the rate of flow of fluid through said inlet port when it exceeds a maximum predetermined value; and
 h. a control element surrounding said stem and of a length to restrict said ports when symmetrically positioned relative thereto.

58. The actuator of claim 57 including a pressure reducing valve in said housing, means for communicating the outlet of said valve to said high pressure chamber, and means for communicating high pressure to the inlet of said valve.

59. In a fluid pressure energized electrically controlled device including: a housing having an elongated cavity; a piston slidable in the cavity; a ported stem extending from one end of the piston into said cavity; the improvement which comprises: a magnetically permeable control sleeve adapted to slide on said stem having an outer narrow band of a diameter to have a clearance with the walls of said cavity less than 0.001 inches and an end of a diameter between 0.001 and 0.003 inches less than said band.

60. The improvement of claim 59 wherein said band is in the middle of said sleeve.

61. The improvement of claim 59 wherein the band is at one end of said sleeve.

62. The improvement of claim 59 wherein said sleeve has an external self-adhering dried liquid coating of a magnetically non-permeable material of a thickness at least twice said clearance.

63. In a fluid pressure actuated device, the combination of:
 a. a piston movable as a result of fluid pressures thereon;
 b. a cylindrical stem movable with said piston and having a pair of axially spaced radially opening ports;
 c. a sleeve on said stem having an inner surface in sliding partially sealed relationship with the outer surface of said stem, the length of said sleeve being slightly longer than the spacing of said ports, whereby the sleeve when symmetrically positioned relative to said ports partially restricts said parts.

64. The combination of claim 63 including a pair of circumferentially extending grooves intersecting said radial ports on the adjacent side surfaces thereof and the ends of said sleeve restrict the flow of fluid through said ports.

65. The combination of claim 63 including a pair of circumferentially extending grooves intersecting said ports on the remote sides thereof and said sleeve has radial ports therethrough with the adjacent side surfaces of said ports being spaced a greater distance apart than the remote side surfaces of said grooves.

66. The combination of claim 63 wherein said sleeve has a groove in its inner surface of a width just less than the axial spacing of the adjacent side surfaces of said ports and a radial passage in said sleeve communicating said groove externally of said sleeve.

67. A fluid pressure energized electrically controlled actuator comprised of in combination:
 (a) a housing having a cylindrical cavity therein;
 (b) a piston having a first-end surface defining with one end of said cavity a high-pressure chamber, and a second end surface defining with the other end of said cavity a control pressure chamber;
 (c) means in said housing communicating a central portion of said piston to low-pressure;
 (d) a cylindrical stem extending from the second end surface of said piston into said control chamber;
 (e) an outlet port in said stem and means communicating samd with an intermediate portion of said piston and said low-pressure;
 (f) a high-pressure inlet port in said stem communicating through said piston to said high-pressure chamber;
 (g) said housing having a second cavity therein, means communicating one end of said second cavity to high pressure and other means communicating said second cavity to said high pressure chamber and filter means in said second cavity between said means; and,
 (h) a control element surrounding said stem and of a length to restrict said ports when symmetrically positioned relative thereto.

* * * * *